(12) United States Patent
Yokoyama et al.

(10) Patent No.: US 11,063,257 B2
(45) Date of Patent: Jul. 13, 2021

(54) POSITIVE ELECTRODE ACTIVE MATERIAL FOR NONAQUEOUS ELECTROLYTE SECONDARY BATTERIES, PRODUCTION METHOD THEREOF, AND NONAQUEOUS ELECTROLYTE SECONDARY BATTERY

(71) Applicant: SUMITOMO METAL MINING CO., LTD., Tokyo (JP)

(72) Inventors: Jun Yokoyama, Niihama (JP); Yuki Furuichi, Niihama (JP); Tetsufumi Komukai, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 141 days.

(21) Appl. No.: 15/771,208

(22) PCT Filed: Oct. 27, 2016

(86) PCT No.: PCT/JP2016/081911
§ 371 (c)(1),
(2) Date: Apr. 26, 2018

(87) PCT Pub. No.: WO2017/073682
PCT Pub. Date: May 4, 2017

(65) Prior Publication Data
US 2019/0020023 A1 Jan. 17, 2019

(30) Foreign Application Priority Data
Oct. 28, 2015 (JP) .............................. JP2015-212318

(51) Int. Cl.
| | | |
|---|---|---|
| *H01M 4/525* | (2010.01) | |
| *C01G 41/00* | (2006.01) | |
| *H01M 4/62* | (2006.01) | |
| *H01M 4/1391* | (2010.01) | |
| *H01M 4/36* | (2006.01) | |
| *C01G 53/00* | (2006.01) | |
| *H01M 4/131* | (2010.01) | |
| *H01M 4/505* | (2010.01) | |
| *H01M 4/04* | (2006.01) | |
| *H01M 10/05* | (2010.01) | |
| *H01M 4/02* | (2006.01) | |

(52) U.S. Cl.
CPC ............ *H01M 4/525* (2013.01); *C01G 41/00* (2013.01); *C01G 53/50* (2013.01); *H01M 4/0442* (2013.01); *H01M 4/0471* (2013.01); *H01M 4/131* (2013.01); *H01M 4/1391* (2013.01); *H01M 4/366* (2013.01); *H01M 4/505* (2013.01); *H01M 4/62* (2013.01); *H01M 10/05* (2013.01); *C01P 2002/52* (2013.01); *C01P 2004/03* (2013.01); *C01P 2004/50* (2013.01); *C01P 2004/61* (2013.01); *C01P 2006/11* (2013.01); *C01P 2006/14* (2013.01); *H01M 2004/021* (2013.01); *H01M 2004/028* (2013.01)

(58) Field of Classification Search
CPC ........ C01G 3/50; H01M 4/366; H01M 4/1391
See application file for complete search history.

(56) References Cited

U.S. PATENT DOCUMENTS

| | | |
|---|---|---|
| 2015/0021518 A1 | 1/2015 | Kokado et al. |
| 2015/0171424 A1 | 6/2015 | Kawai |

FOREIGN PATENT DOCUMENTS

| | | | |
|---|---|---|---|
| EP | 3 024 068 A1 | | 5/2016 |
| JP | H11-016566 A | | 1/1999 |
| JP | 2005-251716 A | | 9/2005 |
| JP | 2009-289726 A | | 12/2009 |
| JP | 2010-040383 A | | 2/2010 |
| JP | 2013-125732 A | | 6/2013 |
| JP | 2013-152866 A | | 8/2013 |
| JP | 2013-171785 A | | 9/2013 |
| JP | 2015-133318 A | | 7/2015 |
| JP | 2015-144108 A | | 8/2015 |
| WO | WO 2012043783 | * | 4/2012 |
| WO | 2013/024739 A1 | | 2/2013 |
| WO | 2015/008582 A1 | | 1/2015 |

(Continued)

OTHER PUBLICATIONS

International Search Report dated Jan. 17, 2017, issued in counterpart application No. PCT/JP2016/081911. (5 pages).
International Preliminary Report on Patentability (Form PCT/IB/373) issued in counterpart International Application No. PCT/JP2016/081911 dated May 1, 2018, with Form PCT/ISA/237. (11 pages).

*Primary Examiner* — Ladan Mohaddes
(74) *Attorney, Agent, or Firm* — Westerman, Hattori, Daniels & Adrian, LLP

(57) ABSTRACT

A positive electrode active material for nonaqueous electrolyte secondary batteries has a high charge/discharge capacity and produces high output, as well as has high filling ability. The positive electrode active material includes lithium-nickel composite oxide particles are formed by agglomeration of multiple primary particles, include pores, and have a layered crystal structure. The lithium-nickel composite oxide particles have an average particle size of 15 μm or more and 30 μm or less. The percentage of an area of the pores measured by a cross-sectional observation of the lithium-nickel composite oxide particles with respect to a cross-sectional area of the lithium-nickel composite oxide particles is 1.0% or more and 5.0% or less. A lithium-tungsten compound containing tungsten and lithium is present on the surface of and inside the secondary particles. The lithium-tungsten compound is present on at least part of the surface of the primary particles.

22 Claims, 8 Drawing Sheets

(56) References Cited

FOREIGN PATENT DOCUMENTS

WO      2015/163273 A1    10/2015
WO      2016/031147 A1    3/2016

* cited by examiner

POSITIVE ELECTRODE ACTIVE MATERIAL FOR NONAQUEOUS ELECTROLYTE SECONDARY BATTERIES, PRODUCTION METHOD THEREOF, AND NONAQUEOUS ELECTROLYTE SECONDARY BATTERY

TECHNICAL FIELD

The present invention relates to a positive electrode active material for nonaqueous electrolyte secondary batteries, a production method thereof, and a nonaqueous electrolyte secondary battery.

BACKGROUND ART

With the recent wide spread use of portable electronic devices, such as mobile phones and notebook personal computers, there has been a strong demand to develop small, light secondary batteries having high energy density. There has been also a strong demand to develop high-output secondary batteries serving as batteries for electric vehicles, including hybrid vehicles. Among secondary batteries that satisfy these demands are nonaqueous electrolyte secondary batteries, such as lithium-ion secondary batteries. A lithium-ion secondary battery includes a negative electrode, a positive electrode, an electrolyte solution, and the like and uses materials capable of inserting and de-inserting lithium as negative and positive electrode active materials.

Nonaqueous electrolyte secondary batteries are currently actively being researched and developed. Among these nonaqueous electrolyte secondary batteries, lithium-ion secondary batteries using layered or spinel lithium-nickel composite oxide particles as a positive electrode material provide 4V-class high voltages and therefore are being commercialized as batteries having high energy density.

Among main positive electrode materials that have been proposed are lithium-cobalt composite oxides ($LiCoO_2$), which are synthesized relatively easily, lithium-nickel composite oxide particles ($LiNiO_2$), which use nickel, which is cheaper than cobalt, lithium-nickel-cobalt-manganese composite oxides ($LiNi_{1/3}Co_{1/3}Mn_{1/3}O_2$), and lithium-manganese composite oxides ($LiMn_2O_4$), which use manganese. Primary importance has been placed in recent years on resistance reduction characteristics essential to increase the output of secondary batteries. Among positive electrode materials, lithium-nickel composite oxide particles are receiving attention as a material that has high cycle characteristics and low resistance and produces high output.

To reduce the resistance of a secondary battery, there have been proposed methods of adding heteroelements to a positive electrode material. Among additive elements, high-valence transition metals, such as W, Mo, Nb, Ta, and Re, are believed to be useful.

For example, Patent Literature 1 proposes a lithium-transition metal-based compound powder that serves as a lithium secondary battery positive electrode material and includes one or more elements selected from Mo, W, Nb, Ta, and Re in an amount of 0.1 to 5% by mol with respect to the total mole amount of Mn, Ni, and Co. Patent Literature 1 states that the atomic ratio of the sum of Mo, W, Nb, Ta, and Re to the sum of Li and metal elements other than Mo, W, Nb, Ta, and Re in the surface of the primary particles in the powder is preferably five times or more that in the entire primary particles. This proposal also states that it is possible to achieve any of cost reduction, safety increase, load characteristic increase, and handleability improvement of a lithium-transition metal-based compound powder serving as a lithium secondary battery positive electrode material.

The lithium-transition metal-based compound powder disclosed in Patent Literature 1 is prepared by crushing a raw material in a liquid solvent, spray-drying a slurry wherein the crushed raw material is dispersed uniformly, and firing the spray-dried slurry. For this reason, some of the heteroelements, such as Mo, W, Nb, Ta, and Re, are substituted by layered Ni, disadvantageously resulting in degradation of battery characteristics such as the battery capacity or cycle characteristics.

Patent Literature 2 proposes a positive electrode active material for nonaqueous electrolyte secondary batteries including at least a lithium-transition metal composite oxide that has a layered structure, consists of one or both of primary particles and secondary particles formed by agglomeration of the primary particles, and has, at least on the surface of the particles, a compound containing at least one selected from a group consisting of molybdenum, vanadium, tungsten, boron, and fluorine. Patent Literature 2 states that it is possible to obtain a positive electrode active material for nonaqueous electrolyte secondary batteries that exhibits excellent battery characteristics even under more harsh use environments. In particular, Patent Literature 2 states that the presence of a compound containing at least one selected from a group consisting of molybdenum, vanadium, tungsten, boron, and fluorine on the surface of the particles improves the initial characteristics of a secondary battery without preventing improvements in the thermal stability, load characteristics, and output characteristics thereof.

However, Patent Literature 2 only mentions improvements in the initial characteristics of a secondary battery, that is, improvements in the initial discharge capacity and initial efficiency, as effects produced by at least one additive element selected from a group consisting of molybdenum, vanadium, tungsten, boron, and fluorine and does not mention output characteristics thereof at all. Also, a production method disclosed in Patent Literature 2 involves mixing additive elements and a hydroxide heat-treated along with a lithium compound and firing the mixture and thus causes substitution of layered nickel for some of the additive elements, disadvantageously resulting in degradation of battery characteristics.

Patent Literature 3 proposes a positive electrode active material that is coated with metals including at least one selected from Ti, Al, Sn, Bi, Cu, Si, Ga, W, Zr, B, and Mo, and/or an intermetallic compound formed by a combination of these metals, and/or an oxide. While Patent Literature 3 states that this coating can absorb oxygen gas and provide safety, it does not mention output characteristics of a secondary battery at all. Also, a production method disclosed in Patent Literature 3 involves coating a positive electrode active material using a planetary ball mill, but this coating method physically damages the positive electrode active material, resulting in degradation of battery characteristics.

Patent Literature 4 proposes a positive electrode active material that is obtained by causing a tungstic acid compound to adhere to composite oxide particles mainly containing lithium nickelate and heating the resulting substance and includes 0.15% by weight or less of carbonate ions. This proposal states that the tungstic acid compound or a decomposed product of the tungstic acid compound is present on the surface of the positive electrode active material and suppresses oxidation activity on the surface of charged composite oxide particles and thus can suppress gas generation due to decomposition of a nonaqueous electrolyte solution or the like, but it does not mention output characteristics at all.

A production method disclosed in Patent Literature 4 involves causing a solution in which a tungsten acid compound and a sulfuric acid compound, nitric acid compound, boric acid compound, or phosphoric acid compound are dissolved as adhering components in a solvent to adhere to composite oxide particles that is preferably heated to a temperature equal to or higher than the boiling point of the solution in which the adhering components are dissolved. This method involves removing the solvent shortly and therefore disadvantageously fails to sufficiently disperse the tungsten compound on the surface of the composite oxide particles and to cause the tungsten compound to uniformly adhere thereto.

There have been also made improvements relating to an increase in the output of lithium-nickel composite oxide particles. For example, Patent Literature 5 proposes a positive electrode active material for nonaqueous electrolyte secondary batteries that includes lithium-nickel composite oxide particles consisting of primary particles and secondary particles formed by agglomeration of the primary particles and that has lithium tungstate represented by one of $Li_2WO_4$, $Li_4WO_5$, and $Li_6W_2O_9$ on the surface of the lithium-nickel composite oxide particles. Patent Literature 5 states that a secondary battery using this positive electrode active material would have a high capacity and produce high output.

CITATION LIST

Patent Literature

[Patent Literature 1] Japanese Unexamined Patent Application Publication No. 2009-289726
[Patent Literature 2] Japanese Unexamined Patent Application Publication No. 2005-251716
[Patent Literature 3] Japanese Unexamined Patent Application Publication No. Hei 11-16566
[Patent Literature 4] Japanese Unexamined Patent Application Publication No. 2010-40383
[Patent Literature 5] Japanese Unexamined Patent Application Publication No. 2013-125732

SUMMARY OF THE INVENTION

Technical Problem

Although Patent Literature 5 proposes the positive electrode active material for nonaqueous electrolyte secondary batteries that produces high output while maintaining a high capacity, further improvements are required due to a strong demand to increase the capacity and output of secondary batteries. Also, to increase the energy density of a battery, it is important to improve the filling ability of the battery. Specifically, by improving the charge/discharge capacity of a positive electrode active material, as well as by improving the filling ability of the positive electrode active material, the per-unit volume capacity of a battery can be improved. Further, it is an important challenge to suppress gas generation during high-temperature storage.

In view of the above problems, an object of the present invention is to provide a positive electrode active material for nonaqueous electrolyte secondary batteries that has a high charge/discharge capacity and produces high output, as well as has high filling ability. Another object of the present invention is to provide a nonaqueous electrolyte secondary battery that by using this positive electrode active material, has high energy density and high output characteristics and suppresses gas generation during high-temperature storage.

Solution to Problem

To solve the above problems, the present inventors intensively investigated the powder characteristics of lithium-nickel composite oxide particles used as a positive electrode active material for nonaqueous electrolyte secondary batteries and the influence of such particles on the positive electrode resistance of a battery. The present inventors then found that by increasing the size of lithium-nickel composite oxide particles and increasing the area of pores occupied in a cross-sectional area of the lithium-nickel composite oxide particles, as well as by forming a lithium-tungsten compound on the surface of the primary particles, it is possible to achieve a reduction in the positive electrode resistance and thus an improvement in output characteristics of a battery and an increase in the energy density thereof, as well as to suppress gas generation during high-temperature storage.

The present inventors also found that by preparing lithium-nickel composite oxide particles under particular conditions as a production method thereof, the area of the pores in the lithium-nickel composite oxide particles can be increased and that by adding a tungsten compound to a cleaned cake obtained by water-cleaning and solid-liquid separating the lithium-nickel composite oxide particles, heat-treating the mixture, a lithium-tungsten compound can be formed on the surface of the primary particles, and then completed the present invention.

A first aspect of the present invention provides a positive electrode active material for nonaqueous electrolyte secondary batteries. The positive electrode active material includes lithium-nickel composite oxide particles that consist of secondary particles, the secondary particles being each formed by agglomeration of multiple primary particles and including pores, have a composition represented by $Li_zNi_{1-x-y}Co_xM_yW_aO_{2+\alpha}$ where $0 \leq x \leq 0.35$; $0 \leq y \leq 0.35$; $0.95 \leq z \leq 1.30$; $0 < a \leq 0.03$; $0 \leq \alpha \leq 0.15$; and M is at least one element selected from Mg, Al, Ca, Ti, V, Cr, Mn, Nb, Zr, and Mo, and have a layered crystal structure. The lithium-nickel composite oxide particles have an average particle size of 15 μm or more and 30 μm or less. The percentage of an area of the pores measured by a cross-sectional observation of the lithium-nickel composite oxide particles with respect to a cross-sectional area of the lithium-nickel composite oxide particles is 1.0% or more and 5.0% or less. A lithium-tungsten compound containing tungsten and lithium is present on the surface of and inside the secondary particles. The lithium-tungsten compound is present on at least part of the surface of the primary particles. The amount of lithium contained in a lithium compound other than the lithium-tungsten compound present on the surface of the primary particles with respect to the total amount of the lithium-nickel composite oxide particles is 0.05% by mass or less.

The sulfate group content of the positive electrode active material for nonaqueous electrolyte secondary batteries may be 0.15% by mass or less. The tap density of the positive electrode active material for nonaqueous electrolyte secondary batteries may be 2.5 g/cm$^3$ or more. The lithium-tungsten compound may contain 0.05% by atom or more and 3.0% by atom or less of tungsten with respect to the sum of the atomic numbers of Ni, Co, and M contained in the lithium-nickel composite oxide particles.

The lithium-tungsten compound may contain lithium tungstate. The lithium-tungsten compound may be present on at least part of the surface of the primary particles as fine particles having particle sizes of 1 nm or more and 500 nm or less. The lithium-tungsten compound may be present on at least part of the surface of the primary particles as coatings having thicknesses of 1 nm or more and 200 nm or less. The lithium-tungsten compound may be present on at least part of the surface of the primary particles as both particles having particle sizes of 1 nm or more and 500 nm or less and coatings having thicknesses of 1 nm or more and 200 nm or less.

A second aspect of the present invention provides a method for producing a positive electrode active material for nonaqueous electrolyte secondary batteries, the positive electrode active material comprising lithium-nickel composite oxide particles that consist of secondary particles, the secondary particles being each formed by agglomeration of multiple primary particles and including pores, have a composition represented by $Li_zNi_{1-x-y}Co_xM_yW_aO_{2+\alpha}$ where $0 \leq x \leq 0.35$; $0 \leq y \leq 0.35$; $0.95 \leq z \leq 1.30$; $0 < a \leq 0.03$; $0 \leq \alpha \leq 0.15$; and M is at least one element selected from Mg, Al, Ca, Ti, V, Cr, Mn, Nb, Zr, and Mo, and have a layered crystal structure. The method includes mixing a nickel composite hydroxide containing nickel and optionally cobalt and M, a nickel-oxy hydroxide obtained from the nickel composite hydroxide, a nickel composite oxide, or a mixture thereof, and a lithium compound so that the molar ratio of lithium in the lithium compound to the sum of the atomic numbers of Ni, Co, and M in the nickel composite hydroxide becomes 0.95 or more and 1.30 or less, to obtain a lithium mixture, firing the lithium mixture at 700° C. or more and 900° C. or less in an oxidizing atmosphere to obtain lithium-nickel composite oxide particles, mixing the lithium-nickel composite oxide particles obtained after the firing with water to form a lithium-nickel composite oxide slurry, cleaning the lithium-nickel composite oxide particles by stirring the slurry, and then solid-liquid separating the resulting slurry to obtain a cleaned cake comprising the lithium-nickel composite oxide particles, mixing the cleaned cake and a tungsten compound that is substantially free of lithium to obtain a tungsten mixture, performing a first heat-treatment involving heat-treating the tungsten mixture to dissolve the tungsten compound and thus to form lithium-nickel composite oxide particles where tungsten is dispersed on the surface of the primary particles and on the surface of and inside the secondary particles, and after the first heat-treatment, performing a second heat-treatment involving performing a heat-treatment at a higher temperature than in the first heat-treatment to obtain lithium-nickel composite oxide particles whose porosity is 1.0% or more and 5.0% or less and where a lithium-tungsten compound is formed on the surface of the primary particles and on the surface of and inside the secondary particles.

The nickel composite hydroxide may be obtained using a method including charging an aqueous solution containing nickel and optionally cobalt and M and an aqueous solution containing an ammonium ion donor into a reaction bath whose temperature is controlled to 40° C. or more and 60° C. or less, to obtain a reaction solution and adding an aqueous solution of sodium hydroxide to the reaction solution so that the pH of the reaction solution is controlled to 12.0 or more and 14.0 or less on a 25° C. solution temperature basis and the ammonia concentration is controlled to 5 g/L or more and 20 g/L or less, to obtain a nickel composite hydroxide slurry, solid-liquid separating the nickel composite hydroxide slurry to obtain a nickel composite hydroxide cake, and cleaning the nickel composite hydroxide cake with water, or cleaning the nickel composite hydroxide cake with an aqueous solution of sodium hydroxide and then cleaning the resulting nickel composite hydroxide cake with water, and then drying the resulting nickel composite hydroxide cake. The nickel composite hydroxide cake may be cleaned with 3.5% by mass or less of an aqueous solution of sodium hydroxide. The sulfate group content of the nickel composite hydroxide may be 0.5% by mass or more and 2.0% by mass or less. The lithium mixture may be obtained by mixing a nickel composite oxide obtained by oxidizing-roasting the nickel composite hydroxide at a temperature of 500° C. or more and 750° C. or less, and the lithium compound.

The concentration of the lithium-nickel composite oxide slurry may be 500 g/L or more and 2500 g/L or less. The water content of the cleaned cake may be controlled to 3.0% by mass or more and 15.0% by mass or less. The lithium compound may be at least one selected from lithium hydroxide, lithium carbonate, and lithium acetate. The tungsten compound may be at least one selected from tungsten oxide, tungstic acid, ammonium paratungstate, and sodium tungstate. The first heat-treatment and the second heat-treatment may be performed in one of a decarboxylated air atmosphere, an inert gas atmosphere, and a vacuum atmosphere. The first heat-treatment may be performed at a heat-treatment temperature of 60° C. or more and 80° C. or less. The second heat-treatment may be performed at a heat-treatment temperature of 100° C. or more and 200° C. or less.

A third aspect of the present invention provides a nonaqueous electrolyte secondary battery including a positive electrode including any one of the above positive electrode active materials for nonaqueous electrolyte secondary batteries.

Advantageous Effects of the Invention

According to the present invention, there is obtained a positive electrode active material for nonaqueous electrolyte secondary batteries that when used as the positive electrode material of a battery, is able to achieve high energy density and high output and to suppress gas generation during high-temperature storage. Also, the production method thereof is easy and suitable for industrial-scale production and therefore the industrial value thereof is extremely high.

DESCRIPTION OF EMBODIMENTS

Figure 1A:
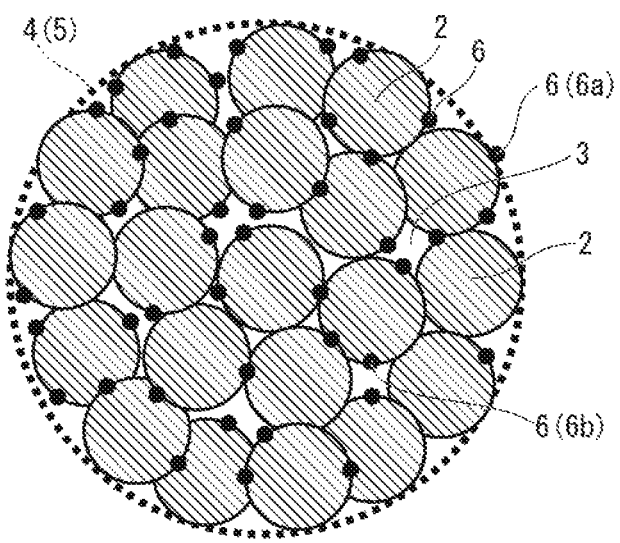
FIGS. 1(A) to 1(C) are schematic drawings showing an example of a positive electrode active material of an embodiment.

Hereafter, an embodiment of the present invention will be described with reference to the drawings. To clarify the elements, the elements are partially highlighted or simplified in the drawings and therefore the structures, shapes, scales, or the like thereof may differ from actual ones. Hereafter, the present embodiment will be described.

Figure 1B:
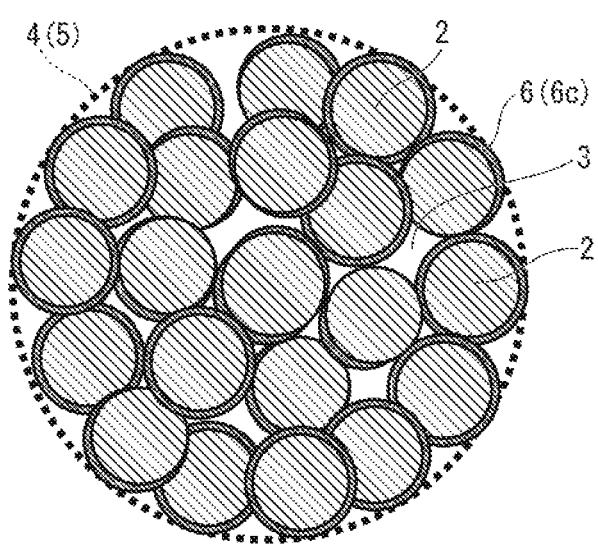
Figure 1C:
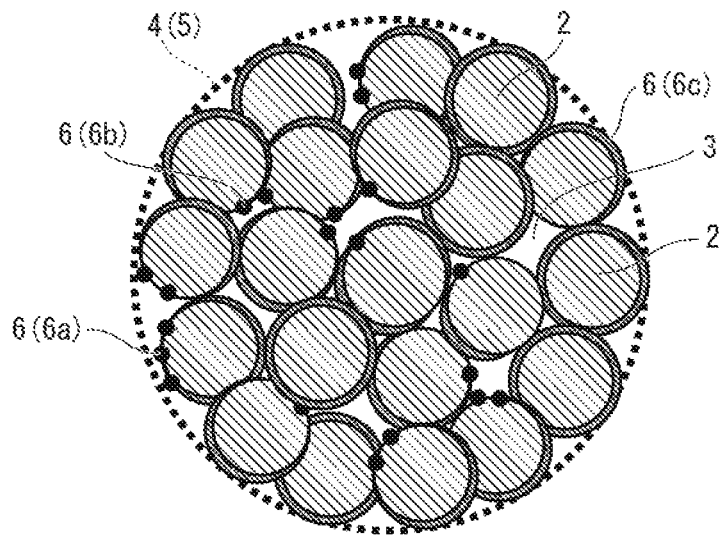

1. Positive Electrode Active Material for Nonaqueous Electrolyte Secondary Batteries FIGS. 1(A) to 1(C) are schematic drawings showing one example of a positive electrode active material for nonaqueous electrolyte secondary batteries (also referred to as "positive electrode active material 1") of the present embodiment. As shown in FIGS. 1(A) to 1(C), a positive electrode active material 1 includes lithium-nickel composite oxide particles 5 (also referred to as "composite oxide particles 5"). The composite oxide particles 5 consist of secondary particles 4 that are each formed by agglomeration of multiple primary particles 2 and that include pores 3. As will be described later, the secondary particles 4 have a lithium-tungsten compound 6 on the surface thereof and thereinside.

The composition of the composite oxide particles 5 is represented by $Li_zNi_{1-x-y}Co_xM_yW_aO_{2+\alpha}$ where $0 \leq x \leq 0.35$; $0 \leq y \leq 0.35$; $0.95 \leq z \leq 1.30$; $0 < a \leq 0.03$; $0 \leq \alpha \leq 0.15$; and M is at least one element selected from Mg, Al, Ca, Ti, V, Cr, Mn, Nb, Zr, and Mo. A secondary battery using the composite oxide particles 5 having such a composition as a positive electrode active material will have a high charge/discharge capacity. The above composition represents the composition of the entire composite oxide particles 5 including the secondary particles 4 and the lithium-tungsten compound 6.

In the composition of the composite oxide particles 5, x and y represent the composition ratio between Co and M in the composite oxide particles 5 and can be adjusted in the above range properly in accordance with the required characteristics or the like. For example, to obtain a higher charge/discharge capacity, x+y, which is the sum of x and y in the above composition, is preferably 0.20 or less, more preferably 0.10 or less.

In the composition of the composite oxide particles 5, z represents the ratio of the atomic number of Li to the sum (Me) of the atomic numbers of the Ni, Co, and M, (Li/Me), in the composite oxide particles 5. z is 0.95 or more and 1.30 or less, preferably 0.97 or more and 1.20 or less, more preferably 0.97 or more and 1.15 or less.

As with a conventionally known lithium-nickel composite oxide, the composite oxide particles 5 have a layered crystal structure. The composite oxide particles 5 include crystals (primary particles 2) having a layered structure and thus are able to insert and de-insert lithium ions in the positive electrode of a secondary battery. Note that the layered structure can be identified by a powder X-ray diffraction measurement.

The average particle size of the composite oxide particles 5 is 15 μm or more and 30 μm or less. To maintain the charge/discharge capacity (may be referred to as "battery capacity") and output characteristics of a secondary battery, the average particle size of a lithium-nickel composite oxide used as a positive electrode active material is typically on the order of 10 μm. On the other hand, to improve the filling ability, the average particle size of the composite oxide particles 5 of the present embodiment is controlled within the above range, which is the range of sizes greater than the typical average size. Thus, the filling ability of the composite oxide particles 5 in the positive electrode can be improved.

By controlling the average particle size of the composite oxide particles 5 within the above range, the battery capacity or output characteristics and the positive electrode filling ability are well-balanced. To further increase the positive electrode filling ability while maintaining the battery capacity or output characteristics, the average particle size of the composite oxide particles 5 is preferably 15 μm or more and 25 μm or less, more preferably 15 μm or more and 20 μm or less.

If the average particle size of the composite oxide particles 5 is below 15 μm, the positive electrode filling ability thereof when used as the positive electrode active material of a battery would be reduced, resulting in a reduction in the per-unit volume battery capacity. Also, if the average particle size is above 30 μm, the contact area between the positive electrode active material and the electrolyte solution would be reduced, resulting in a reduction in the battery capacity or output characteristics. As used herein, the term "average particle size" refers to a mean volume diameter (MV) and can be measured using a laser diffraction/scattering particle size analyzer.

The tap density of the positive electrode active material 1 is preferably 2.5 g/cm$^3$ or more. If the tap density of the positive electrode active material 1 is within the above range, the positive electrode filling ability can be further increased, resulting in a further increase in the energy density when used in a battery. The tap density is more preferably 2.5 g/cm$^3$ or more and 4.0 g/cm$^3$ or less, even more preferably 2.5 g/cm$^3$ or more and 3.5 g/cm$^3$ or less. The tap density of the positive electrode active material 1 can be controlled within the above range by controlling the average particle size of the composite oxide particles 5 within the above range and controlling the porosity of the composite oxide particles 5.

The percentage of the area of the pores 3 measured by a cross-sectional observation of the composite oxide particles 5 to a cross-sectional area of the composite oxide particles (also referred to as "porosity") is 1.0% or more and 5.0% or less, preferably 1.0% or more and 4.5% or less. If the porosity is within the above range, the electrolyte solution can be caused to sufficiently permeate the secondary particles 4 to the extent that it reaches the inside of the secondary particles 4.

As described above, the composite oxide particles 5 consist of the secondary particles 4 formed by agglomeration of the primary particles 2. For this reason, if the composite oxide particles 5 are used as the positive electrode active material of the positive electrode of a battery, the composite oxide particles 5 and the electrolyte solution contact each other not only on the outer surface of the secondary particles 4 and in the vicinity of the outer surface but also in the pores 3 inside the secondary particles 4. While the average particle size of the composite oxide particles 5 is greater than that of a typical positive electrode active material, the porosity thereof is within the above range. Thus, a sufficient contact area can be obtained between the composite oxide particles 5 and the electrolyte solution, resulting in improvements in the battery capacity and output characteristics. The porosity of the composite oxide particles 5 can be easily controlled within the above range, for example, by controlling the content of sulfate groups (SO$_4$) in a nickel composite hydroxide serving as a precursor of the composite oxide particles 5 (base material) within a predetermined range as described below.

If the porosity of the composite oxide particles 5 is below 1.0%, the contact area between the composite oxide particles 5 and the electrolyte solution would be reduced, failing to improve the battery capacity and output characteristics. Also, if the porosity is above 5%, the contact area between the composite oxide particles 5 and the electrolyte solution contact would be excessively increased, resulting in a reduction in the thermal stability. Further, the primary particles 2 may be insufficiently crystallized, resulting in an increase in the reaction resistance.

The porosity can be determined by observing an arbitrary cross-section of the composite oxide particles 5 using a scanning electron microscope and analyzing an obtained image. Specifically, the porosity can be determined as follows: multiple composite oxide particles 5 are embedded in a resin or the like; a cross-section sample is prepared using a cross-section polisher or the like so that a cross-section of the composite oxide particles 5 can be observed using a scanning electron microscope; then, using image analysis software (e.g., WinRoof 6.1.1), pores 3 in the outline of arbitrary 20 or more composite oxide particles 5 (secondary particles 4) are detected as black portions, and the dense portions (primary particles 2) therein are detected as white portions, respectively; the total area of the black portions and white portions of the 20 or more composite oxide particles 5 is measured; and the area ratio [black portions/(black portions+white portions)] is calculated as the porosity.

The positive electrode active material 1 (composite oxide particles 5) has the lithium-tungsten compound 6 (may be referred to as "LW compound 6") on the surface of and inside the secondary particles 4 (core). The LW compound 6 is present, for example, on at least part of the surface of the primary particles 2 in the form of fine particles 6a, 6b, as shown in FIG. 1(A). The LW compound 6 includes, for example, a LW compound 6 (6a) present on the surface of the primary particles 2 exposed to the outer surface of the secondary particles 4 and a LW compound 6 (6b) present on the surface of the primary particles 2 exposed to the pores 3 inside the secondary particles 4. Note that the LW compound 6 may be present in a form other than the fine particles 6a, 6b and, for example, may be present in the form of thin films 6c [FIG. 1(B)] or in the form in which fine particles 6a, 6b and thin films are mixed [FIG. 1(C)].

The LW compound 6 includes lithium (Li) and tungsten (W) and has high lithium-ion conductivity and a lithium-ion migration promotion effect. Typically, if the surface of a positive electrode active material is completely covered by a different type of compound, the migration (intercalation) of lithium ions is greatly restricted. As a result, the high capacity of lithium-nickel composite oxide particles, which is an advantage, may be reduced. On the other hand, in the positive electrode active material 1 of the present embodiment, the LW compound 6 is present on the surface of the primary particles 2. Thus, if the positive electrode active material 1 is used as the positive electrode of a secondary battery, Li conduction paths are formed on the interface between the positive electrode active material 1 and the electrolyte solution, resulting in a reduction in the reaction resistance of the positive electrode active material (may be referred to as "positive electrode resistance") and increases in the battery capacity and output characteristics.

The reduction in the positive electrode resistance of the secondary battery will reduce the voltage lost in the battery and relatively increase the voltage actually applied to the load, resulting in production of high output. Also, the reduction in the positive electrode resistance of the secondary battery will increase the voltage applied to the load and allow a sufficient amount of lithium ions to be inserted into and de-inserted from the secondary battery, resulting in an increase in the battery capacity. Note that the functions of the LW compound 6 are not limited to those described above.

In a secondary battery, the positive electrode active material 1 and an electrolyte solution contact each other on the surface of the primary particles 2. For this reason, it is important that the LW compound 6 be present on the surface of the primary particles. As used herein, the term "the surface of the primary particles 2" refers to all portions of the primary particles 2 that can contact an electrolyte solution when producing a battery. That is, the surface of the primary particles 2 includes not only the surface of the primary particles 2 exposed to the surface of the secondary particles 4 and the surface of the primary particles 2 exposed to the pores 3, but also, for example, the vicinity of the surface of the secondary particles 4 that communicates with the outside and is permeable by the electrolyte solution and the electrolyte solution-permeable boundaries between incompletely bonded primary particles 2. The positive electrode active material 1 has the lithium-tungsten compound 6 on the surface of the primary particles 2 that can contact the electrolyte solution and thus promotes the migration of lithium ions inside the composite oxide particles 5.

Typically, a positive electrode active material having a smaller particle size has a better battery capacity and output characteristics. While the positive electrode active material 1 of the present embodiment includes the composite oxide particles 5 having a greater average particle size in order to improve the positive electrode filling ability, the porosity of the composite oxide particles 5 is within the above range and the LW compound 6 is present on the surface of the primary particles 2. Thus, the battery capacity and output characteristics are significantly increased.

The LW compound 6 includes tungsten (W) in an amount of preferably more than 0% by atom and 3.0% by atom or less, more preferably 0.05% by atom or more and 3.0% by atom or less, even more preferably 0.05% by atom or more and 2.0% by atom or less, particularly preferably 0.08% by atom or more and 1.0% by atom or less with respect to the sum of the atomic numbers of Ni, Co, and M included in the composite oxide particles 5. If the content of W is within the above range, the high battery capacity and output characteristics are further increased. If the positive electrode active material 1 is produced, for example, using a method described below, lithium (surplus lithium) present on the surface of the primary particles of the lithium-nickel composite oxide particles (base material) and W in the tungsten compound react with each other to form an LW compound 6. Thus, the surplus lithium can be reduced, and gas generation in the battery during high-temperature storage can be suppressed.

The LW compound 6 preferably includes lithium tungstate. Examples of lithium tungstate include $Li_2WO_4$, $Li_4WO_5$, $Li_6W_2O_9$ and mixtures thereof. Preferably, 50% (molar ratio) or more of W contained in the lithium tungstate is in the form of $Li_4WO_5$ among these forms. More preferably, 65% or more of W is present in the form of $Li_4WO_5$. Among the forms of lithium tungstate, $Li_4WO_5$ includes more Li ion conduction paths and has a higher Li ion migration promotion effect. For this reason, if W is present in the form of $Li_4WO_5$, a higher reaction resistance reduction effect can be obtained.

If the LW compound 6 is present in the form of fine particles as shown in FIG. 1(A), the fine particles of the LW compound 6 preferably have particle sizes of 1 nm or more and 500 nm or less. Thus, a sufficient contact area is obtained between the composite oxide particles 5 and the electrolyte solution, effectively improving lithium-ion conductivity. Further, the charge/discharge capacity of the positive electrode active material 1 can be increased, and the positive electrode resistance can be more effectively reduced.

If the fine particles of the LW compound 6 have particle sizes of below 1 nm, the fine particles may not have sufficient lithium-ion conductivity. Also, if the fine particles of the LW compound 6 have particle sizes of above 500 nm, the fine particles may be formed non-uniformly on the surface of the primary particles 2, failing to obtain a sufficient positive electrode resistance reduction effect.

The sizes of the fine particles of the LW compound 6 are more preferably 1 nm or more and 300 nm, even more preferably 5 nm or more and 200 nm or less. If the particle sizes are within the above range, the fine particles of the LW compound are more easily formed on the surface of the primary particles 2, allowing a higher positive electrode resistance reduction effect to be obtained. Note that 50% or more of the fine particles of the LW compound 6 formed on the surface of the primary particles 2 only have to have particle sizes within the above range. The fine particles of the LW compound 6 are preferably uniformly present on the entire surface of the primary particles 2.

The LW compound 6 only has to be present on at least part of the surface of the primary particles 2. For example, the LW compound 6 may be present on the entire surface of the primary particles 2, or may be scattered on some parts of the surface of the primary particles 2. Even if the LW compound 6 is scattered, a reaction resistance reduction effect is obtained as long as the LW compound 6 is formed on the surface of the primary particles 2 exposed to the outer surface and the inside of the secondary particles 4.

For example, as shown in FIG. 1(B), the LW compound 6 may be present on at least part of the surface of the primary particles 2 in the form of the coatings (thin films) 6c. If the primary particles 2 have the thin films 6c thereon, Li conduction paths can be formed on the interfaces between the primary particles 2 and the electrolyte solution while suppressing a reduction in the specific surface area. Thus, the charge/discharge capacity is further increased, and a higher reaction resistance reduction effect is obtained.

The thin films 6c may be present on the surface of the primary particles, for example, as coatings having thicknesses of 1 nm or more and 200 nm or less. If the thicknesses of the thin films 6c are below 1 nm, the coatings may not have sufficient lithium-ion conductivity. Also, if the thicknesses of the thin films 6c are above 200 nm, the lithium-ion conductivity may be reduced, failing to obtain a higher reaction resistance reduction effect.

The thicknesses of the thin films 6c are preferably 1 nm or more and 150 nm or less, more preferably 1 nm or more and 100 nm or less. If the thicknesses are within the above range, the charge/discharge capacity can be further increased, and a higher reaction resistance reduction effect can be obtained.

The thin films 6c may be formed on some parts of the surface of the primary particles, and the thicknesses of all the thin films 6c need not be within the above range. For example, if coatings having thicknesses of 1 nm or more and 200 nm or less are formed on at least some parts of the surface of the primary particles 2, a high effect can be obtained.

The LW compound 6 may also be present on at least some parts of the surface of the primary particles 2 in the form in which the fine particles 6a, 6b and the thin films 6c are mixed, as shown in FIG. 1(C). In this case also, a high battery characteristics improvement effect can be obtained.

Figure 2:
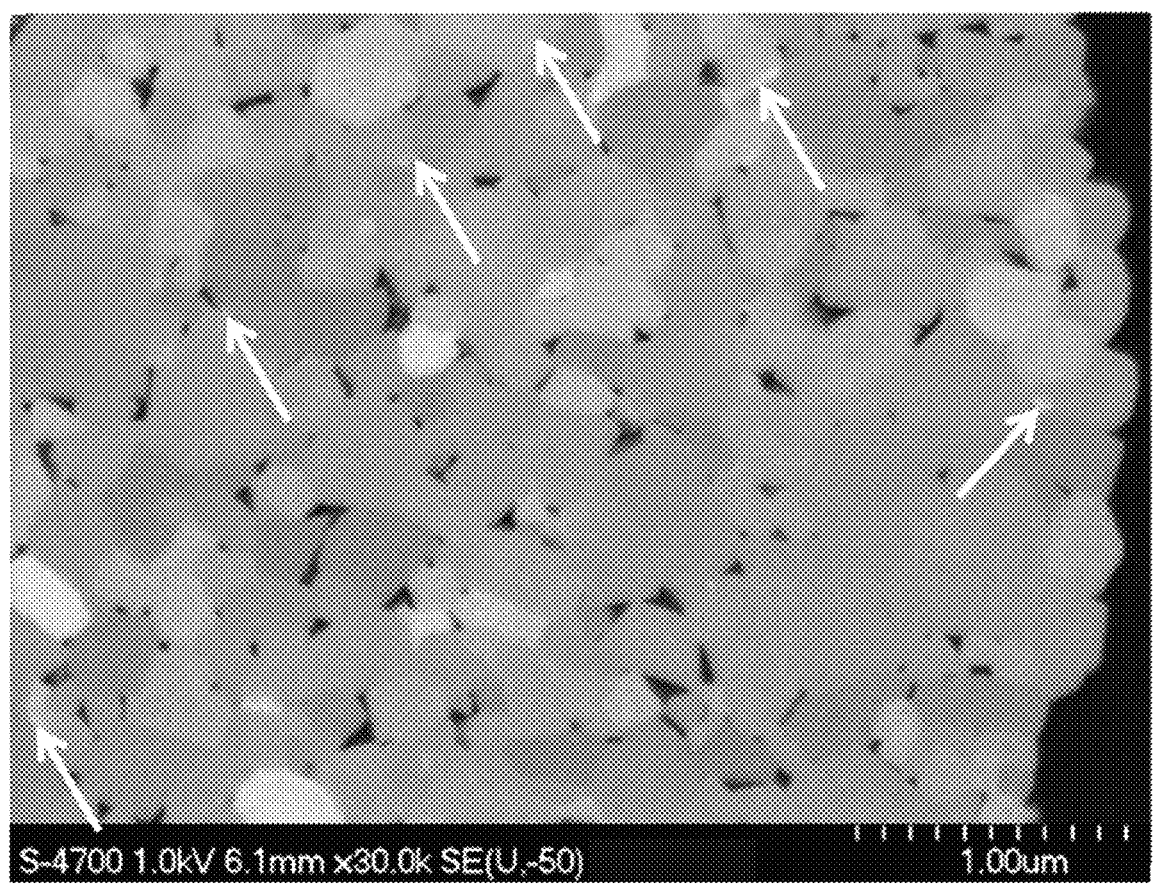
FIG. 2 is a drawing substitution photograph showing an example of a cross-sectional SEM observation result (observation magnification: 30,000×) of a lithium-nickel composite oxide 2 of the embodiment.

The properties of the surface of the primary particles 2 of the composite oxide particles 5 can be determined, for example, by observation using a field emission scanning electron microscope (SEM), transmission electron microscope (TEM), or the like. FIG. 2 is a drawing showing an example of a field emission scanning electron microscopic image (SEM) of a cross-section of the composite oxide particles 5. In FIG. 2, the LW compound 6 is found to be present in positions shown by arrows. The presence, presence form, composition, and the like of the LW compound in the positive electrode active material 1 can be detected using a method described in Examples (to be discussed later).

In the positive electrode active material 1, the LW compound 6 is preferably uniformly formed among the composite oxide particles 5. If the LW compound 6 is formed non-uniformly among the composite oxide particles 5, lithium ions would migrate non-uniformly among the particles. Consequently, particular composite oxide particles 5 would be put under a load. If such a positive electrode active material is used as the positive electrode of a battery, the degradation of the cycle characteristics or an increase in the reaction resistance is more likely to occur.

In the composite oxide particles 5, a lithium compound other than the LW compound 6 may be present on the surface of the primary particles 2. Examples of a lithium compound other than the LW compound 6 include lithium hydroxide and lithium carbonate. Such a lithium compound other than the LW compound 6 has poor lithium conductivity and therefore blocks the migration of lithium ions from the lithium-nickel composite oxide. If the porosity is relatively high as is seen in the composite oxide particles 5 of the present embodiment, the surface of the primary particles 2 has a larger area and therefore the influence of a lithium compound other than the LW compound 6 is more likely to be increased.

The amount of lithium contained in a lithium compound other than the LW compound 6 (may be referred to as "the amount of surplus lithium") with respect to the total amount of the composite oxide particles 5 is 0.05% by mass or less, preferably 0.03% by mass or less. If the amount of surplus lithium is within the above range, a high battery capacity and output characteristics are obtained. Reducing the amount of surplus lithium can further increase the lithium-ion migration promotion effect produced by the LW compound 6 and reduce the positive electrode resistance.

To suppress degradation of the battery characteristics, the lower limit of the amount of surplus lithium is preferably 0.01% by mass or more. If the amount of surplus lithium is too small, an excess amount of lithium may be drawn out from the crystals of the composite oxide particles 5 when the LW compound 6 is formed. The amount of surplus lithium can be determined by adding pure water to the positive electrode active material 1, stirring the solution for a predetermined time, and then evaluating the weights of the components of an eluted lithium compound (including an LW compound) by acid-base titration using hydrochloric acid. For example, the amount of surplus lithium can be obtained by adding 75 mL of pure water to 15 g of the positive electrode active material, stirring the solution for 15 min, then filtering the solution, adding hydrochloric acid to the solution while measuring the pH of the filtrate, calculating the amount of lithium contained in the lithium compound from the resulting neutralization point, and subtracting, from the calculated amount of lithium, the amount of lithium contained in the LW compound estimated from the amount of tungsten obtained by chemical analysis such as ICP emission spectrometry.

The sulfate group content of the positive electrode active material 1 is preferably 0.15% by mass or less, more preferably 0.12% by mass or less, even more preferably 0.10% by mass or less. If a battery is produced using the composite oxide particles 5 having a sulfate group content of more than 0.15% by mass, an unnecessary negative electrode material in an amount equivalent to the irreversible capacity of the positive electrode material must be used in the battery. As a result, the capacity per unit weight and per unit volume of the entire battery is reduced. Further, excess lithium accumulated on the negative electrode as the irreversible capacity is problematic in terms of thermal stability. The lower limit of the sulfate group content of the positive electrode active material may be any percentage and is, for example, 0.001% by mass or more. Note that the sulfate group content can be obtained by converting the amount of S (sulfur element) measured by IPC emission spectrometry (ICP) into the amount of sulfate groups ($SO_4$).

As represented in the composition of the composite oxide particles 5, the amount of lithium in the entire composite oxide particles 5 (positive electrode active material 1), Li/Me, is 0.95 or more and 1.30 or less, preferably 0.97 or more and 1.20 or less, more preferably 0.97 or more and 1.15 or less. As used herein, the term "the amount of lithium in the entire composite oxide particles 5" refers to an amount including the amount of lithium in the secondary particles 4 (core) and the amount of lithium in the LW compound 6. Accordingly, by controlling the amount of lithium in the entire composite oxide particles 5 within the above range, the amount of lithium in the secondary particles 4 (core), (Li/Me), can be controlled within 0.95 or more and 1.25 or less, preferably 0.95 or more and 1.15 or less, more preferably 0.95 or more and 1.10 or less. If Li/Me in the entire composite oxide particles 5 is below 0.95, the positive electrode of a nonaqueous electrolyte secondary battery using this positive electrode active material would have a large reaction resistance, which may reduce the output of the battery. Also, if Li/Me in the entire composite oxide particles 5 is above 1.30, the initial discharge capacity of the positive electrode active material may be reduced, and the reaction resistance of the positive electrode may be increased. If the positive electrode active material 1 is produced using a production method described below, lithium contained in the lithium-nickel composite oxide particles (base material) with which a tungsten compound has yet to be mixed becomes the lithium component of the LW compound 6. Accordingly, the amount of lithium in the entire positive electrode active material does not change between before and after forming the LW compound 6 (that is, the amount of lithium in the lithium-nickel composite oxide particles serving as a base material before forming the lithium-tungsten compound 6 and that in the composite oxide particles 5 after forming the LW compound 6 are the same).

The amount of lithium, Li/Me, in the entire positive electrode active material 1 is more preferably 0.97 or more and 1.15 or less. If the positive electrode active material 1 is produced using the production method described below, Li/Me in the secondary particles 4 (core) where the LW compound 6 has been formed on the surface of the primary particles 2 of the composite oxide particles 5 is lower than that before forming the LW compound 6. For this reason, by controlling Li/Me in the entire positive electrode active material 1 to 0.97 or more, a more favorable charge/discharge capacity and reaction resistance can be obtained.

Battery capacity and output characteristics improvement effects produced by the presence of the lithium-tungsten compound 6 on the surface of the primary particles 2 of the composite oxide particles containing lithium can be obtained by not only the composite oxide particles 5, but also composite oxide particles represented by other compositions, including lithium-cobalt-based composite oxide particles, lithium-manganese-based composite oxide particles, lithium-nickel-cobalt-manganese-based composite oxide particles, and commonly used other positive electrode active materials for lithium secondary batteries.

Figure 3:
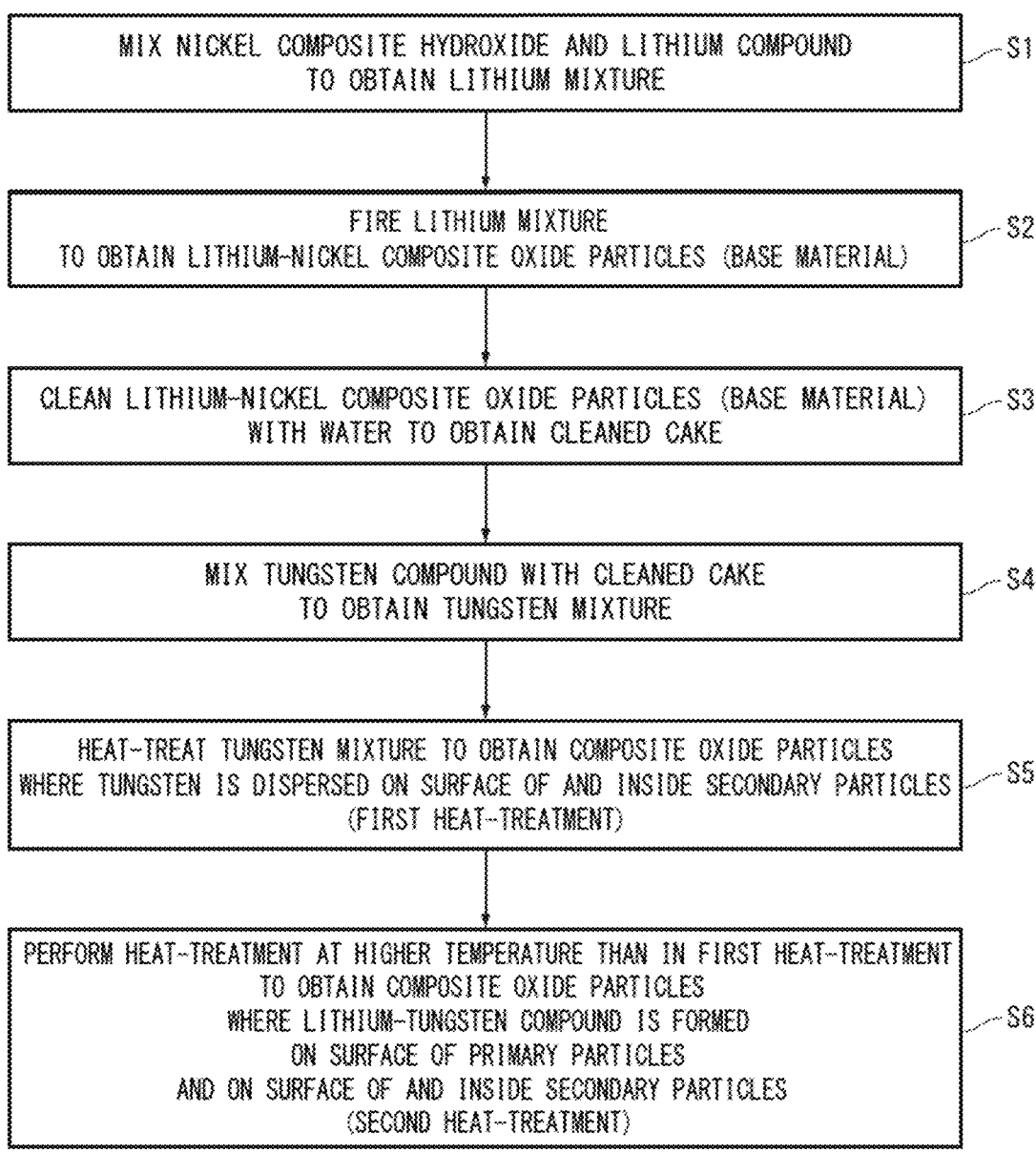
FIG. 3 is a flowchart showing an example of a method for producing the positive electrode active material of the embodiment.
Figure 4:
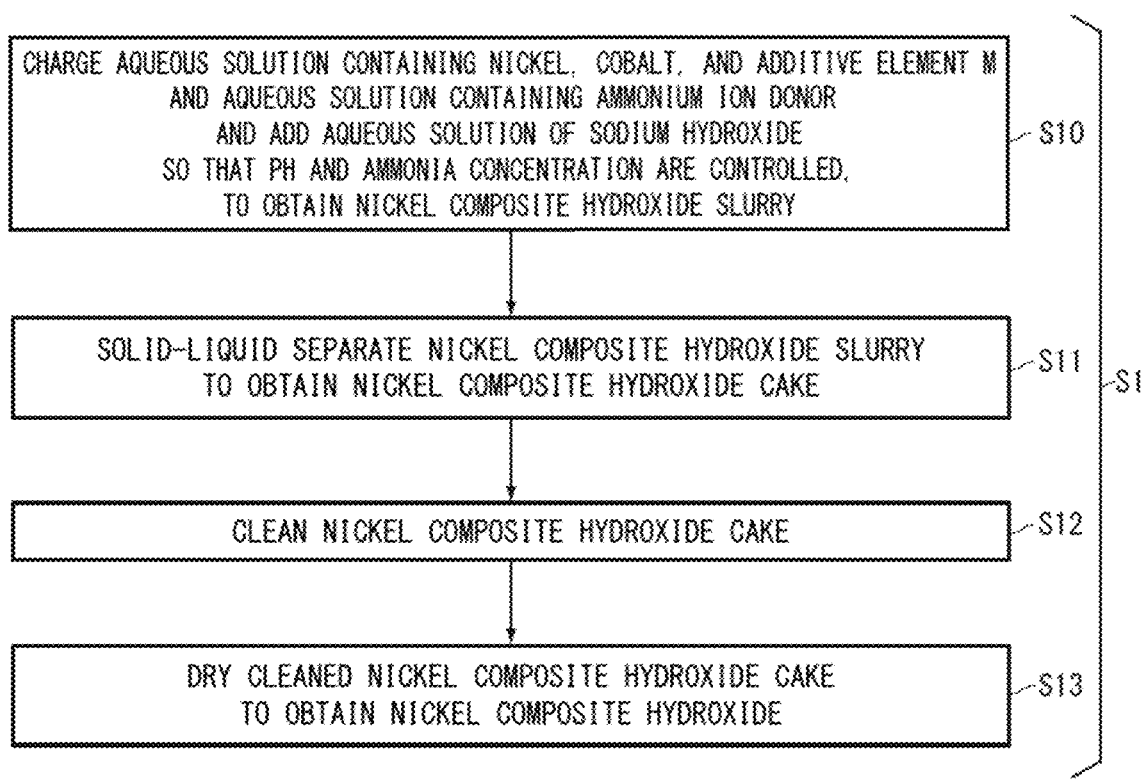
FIG. 4 is a flowchart showing an example of a method for producing a nickel composite hydroxide.

2. Method for Producing Positive Electrode Active Material for Nonaqueous Electrolyte Secondary Batteries FIG. 3 is a flowchart showing an example of a method for producing the positive electrode active material 1 according to the present embodiment. Note that the production method described below is illustrative only and other production methods may be used. In the description with reference to the flowchart of FIG. 3, FIG. 4 is referred to as necessary.

As shown in FIG. 3, the production of the positive electrode active material 1 of the present embodiment starts with mixing a nickel composite hydroxide and a lithium compound to obtain a lithium mixture (step S1). The nickel composite hydroxide includes nickel and optionally cobalt and an additive element M (at least one element selected from Mg, Al, Ca, Ti, V, Cr, Mn, Nb, Zr, and Mo).

The nickel composite hydroxide may be prepared using any method and may be prepared using, for example, a crystallization method such as coprecipitation or homogeneous precipitation. FIG. 4 shows a preferred example of a method for preparing a nickel composite hydroxide. As shown in FIG. 4, the method for preparing a nickel composite hydroxide includes charging an aqueous solution containing nickel and optionally cobalt and an additive element M (nickel-containing aqueous solution) and an aqueous solution containing an ammonium ion donor (ammonium ion-containing aqueous solution) into a reaction bath whose temperature is controlled to 40° C. or more and 60° C. or less to obtain a reaction solution, adding an aqueous solution of sodium hydroxide to the reaction solution, and controlling the pH and the ammonia concentration to obtain a nickel hydroxide slurry (step S10).

The nickel-containing aqueous solution contains nickel and optionally cobalt and M (at least one selected from Mg, Al, Ca, Ti, V, Cr, Mn, Nb, Zr, and Mo). The total concentration of the salts of the metals (nickel, cobalt, and M) in the nickel-containing aqueous solution is preferably 1.5 mol/L or more and 2.5 mol/L or less, more preferably 1.8 mol/L or more and 2.2 mol/L or less. If the total concentration of the metal salts in the nickel-containing aqueous solution is below 1.5 mol/L, the crystals of the composite hydroxide particles may not sufficiently grow. Also, if the total concentration is above 2.5 mol/L, the saturation concentration at room temperature is exceeded. Thus, crystals may reprecipitate, causing clogging of the tube, or the like. Note that the nickel-containing aqueous solution may contain other components without departing from the spirit of the present invention.

The ammonium ion-containing aqueous solution may be of any type as long as it can form a nickel-ammine complex in the reaction solution. For example, ammonia water, or an aqueous solution of ammonium sulfate or ammonium chloride may be used. Note that the ammonium ion-containing aqueous solution may contain other components without departing from the spirit of the present invention.

The composition ratio between nickel, cobalt, and M in the nickel composite hydroxide is inherited by lithium-nickel composite oxide particles (positive electrode active material). For this reason, a nickel-containing aqueous solution is prepared such that the composition ratio between nickel, cobalt, and M in the lithium-nickel composite oxide particles is obtained. The nickel salt may be of any type, but is preferably sulfate, whose crystallinity is easily controlled in a subsequent firing step. As with nickel, the salts of cobalt and M, which are optional components, may be of any type, but are preferably sulfates.

The temperature of the reaction bath is preferably controlled to 40° C. or more and 60° C. or less. If the temperature is below 40° C., composite hydroxide particles having an intended composition ratio may not be obtained, since the solubility of nickel and cobalt is too low. Also, if the temperature is above 60° C., only a fine powder may be obtained, since nucleus formation preferentially proceeds in the solution while crystal growth does not proceed. Further, the energy for holding the temperature of the reaction bath may be increased, resulting in a reduction in productivity.

To keep the pH of the reaction solution in the reaction bath at a predetermined pH, an adjusted amount of an aqueous solution of sodium hydroxide is added to the reaction solution so that the pH of the reaction solution is controlled to 12.0 or more and 14.0 or less on a 25° C. solution temperature basis and the ammonia concentration is controlled to 5 g/L or more and 20 g/L or less, to obtain a nickel composite hydroxide slurry.

If ammonia water is used as an ammonium ion donor, the ammonia concentration thereof is preferably 20% by mass or more and 30% by mass or less, more preferably 22% by mass or more and 28% by mass or less. Limiting the concentration of the ammonia water within such a range can minimize the loss of ammonia due to volatility or the like and thus improve the production efficiency. The ammonia concentration of the reaction solution is controlled within a range of 5 g/L or more and 20 g/L or less, preferably a range of 8 g/L or more and 17 g/L or less, more preferably a range of 10 g/L or more and 15 g/L or less. Controlling the ammonia concentration of the reaction solution within such a range allows for formation of more spherical composite hydroxide particles while preventing composition deviation.

The concentration of the aqueous solution of sodium hydroxide is preferably 20% by mass or more and 50% by mass or less, more preferably 20% by mass or more and 30% by mass or less. Controlling the concentration within such a range allows for prevention of a local increase in the pH value in the addition position while reducing the amount of aqueous solution added to the reaction system and thus allows for efficient production of composite hydroxide particles having a narrow particle size distribution.

The pH value of the reaction solution is controlled within preferably a range of 12.0 or more and 14.0 or less, more preferably a range of 12.5 or more and 13.5 or less, even more preferably a range of 12.8 or more and 13.2 or less on a 25° C. solution temperature basis. If the pH value is above 14.0, tiny nuclei may be formed, resulting in gelling of the reaction solution. Also, if the pH value is below 12.0, a nucleus formation reaction, as well as a nucleus growth reaction occurs. Thus, heterogeneous nuclei having a wide particle size distribution may be formed.

Then, the slurry is solid-liquid separated to obtain a nickel composite hydroxide cake (step S11). The slurry may be solid-liquid using any method, including a known method. For example, a filter may be used.

Then, the nickel composite hydroxide cake is cleaned with water, or cleaned with an aqueous solution of sodium hydroxide and then cleaned with water (step S12). If the nickel composite hydroxide cake is cleaned with an aqueous solution of sodium hydroxide, the concentration of the aqueous solution of sodium hydroxide is preferably 3.5% by mass or less, more preferably 3% by mass or less. If the concentration of the aqueous solution of sodium hydroxide is above 3.5% by mass, the sulfate group content of the nickel composite hydroxide is reduced, resulting in size-reduction of pores in lithium-nickel composite oxide particles obtained after firing. Thus, a sufficient charge/discharge capacity or output characteristics may not be obtained.

Then, the cleaned nickel composite hydroxide cake is dried to obtain a nickel composite hydroxide (step S13). The sulfate group ($SO_4$) content of the nickel composite hydroxide is preferably 0.4% by mass or more and 2.0% by mass or less. If the sulfate group content is within the above range, the contraction of the secondary particles due to the growth of the primary particles during firing can occur to an appropriate degree, allowing for easy control of the porosity. On the other hand, if the sulfate group content of the nickel composite hydroxide is below 0.4% by mass, lithium-nickel composite oxide particles having a lower porosity may be obtained after firing, failing to obtain sufficient battery capacity and output characteristics. Also, If the sulfate group content of the nickel composite hydroxide is above 2.0% by mass, lithium-nickel composite oxide particles having too high a porosity may be obtained after firing, resulting in a reduction in the tap density. Thus, a high charge/discharge capacity may not be obtained, or a greater amount of gas may be generated in a charge/discharge repetition process. The sulfate group content of the nickel composite hydroxide can be controlled within the above range by crystallizing the nickel composite hydroxide under the above conditions (step S10) and then sufficiently cleaning the nickel composite hydroxide cake (step 12).

In step S1, the nickel composite hydroxide may be a nickel-oxy composite hydroxide. A nickel-oxy composite hydroxide may be prepared using any method, but is preferably prepared by oxidizing the nickel composite hydroxide prepared in the above manner using an oxidant, such as sodium hypochlorite or hydrogen peroxide water. The nickel-oxy composite hydroxide obtained using this method serves as a powder having a high bulk density.

In step S1, a nickel composite oxide may be used in place of a nickel composite hydroxide. If a nickel composite oxide is mixed with a lithium compound and then the mixture is fired, there can be obtained a lithium-nickel composite oxide having a stable composition ratio between lithium and metals other than lithium. If this lithium-nickel composite oxide is used as a positive electrode active material, high charge/discharge capacity and output characteristics can be obtained.

A nickel composite oxide may be prepared using any method, but is preferably obtained by oxidizing-roasting a nickel composite hydroxide or nickel-oxy composite hydroxide in an oxidizing atmosphere. The atmosphere in which a nickel composite hydroxide or the like is oxidizing-roasted only has to be an oxidizing atmosphere, but is preferably an air atmosphere in terms of handleability or cost.

The temperature at which a nickel composite hydroxide or the like is oxidizing-roasted is preferably 500° C. or more 750° C. or less, more preferably 550° C. or more and 700° C. or less. If the oxidizing-roasting temperature is below 500° C., the nickel composite hydroxide may be incompletely converted into a nickel composite oxide. If a lithium-nickel composite oxide is formed from an incompletely converted nickel composite oxide, the composition is more likely to become unstable. Also, when the lithium-nickel composite oxide is fired, the composition is more likely to become non-uniform. If the nickel composite oxide still contains the nickel composite hydroxide after oxidizing-roasting, vapor may occur during firing, disadvantageously blocking the reaction between the lithium compound and the nickel composite oxide and thus reducing crystallinity.

Also, if the temperature at which a nickel composite hydroxide is oxidizing-roasted is above 750° C., a nickel composite oxide having high crystallinity is obtained. Also, a lithium compound and the nickel composite oxide react with each other with lower reactivity in a subsequent firing step. Finally, a lithium-nickel composite oxide having lower crystallinity may be obtained. Further, the nickel composite oxide may cause abrupt grain growth, forming bulky nickel composite oxide particles. Furthermore, when a lithium compound is mixed with the nickel composite oxide and fired, a lithium-nickel composite oxide having too large an average particle size may be obtained.

The time during which the nickel composite hydroxide is held at the oxidizing-roasting temperature is preferably 1 h or more and 10 h or less, more preferably 2 h or more and 6 h or less. If the holding time is below 1 h, the nickel composite hydroxide may be incompletely converted into a nickel composite oxide; if the holding time is above 10 h, a nickel composite oxide having too high crystallinity may be obtained.

The nickel composite hydroxide, nickel-oxy hydroxide, nickel composite oxide, or a mixture thereof (also referred to as "nickel composite hydroxide or the like") obtained using the above method is mixed with a lithium compound. The lithium compound to be mixed may be of any type and may be at least one selected from a group consisting of a hydroxide of lithium, an oxyhydroxide thereof, an oxide thereof, a carbonate of lithium, a nitrate of lithium, and a halide of lithium. Preferably, the lithium compound is at least one selected from lithium hydroxide, lithium carbonate, and lithium acetate. Use of such a lithium component is advantageous in that impurities do not remain after firing. It is preferred to use, as the lithium compound, a hydroxide of lithium, which has good reactivity with the nickel composite hydroxide or the like.

The nickel composite hydroxide or the like and the lithium compound may be mixed at any mixing ratio. However, the composition ratio between lithium and metal elements other than lithium in the lithium mixture obtained by mixing the nickel composite hydroxide or nickel composite oxide and the lithium compound is substantially inherited by a lithium-nickel composite oxide obtained after firing. For this reason, the molar ratio of lithium to the sum of nickel and other metal elements (Ni, Co, and M) in the lithium mixture is preferably 0.95 or more and 1.30 or less, more preferably 0.97 or more and 1.15 or less.

If the molar ratio is below 0.95, a fired powder having very low crystallinity and a lithium content of below 0.95 may be obtained. Also, when such a fired powder reacts with a tungsten compound in a subsequent step, lithium-nickel composite oxide particles short of lithium may be obtained, failing to obtain high charge/discharge capacity and output characteristics. Also, if the molar ratio is above 1.30, firing is more likely to proceed so that the lithium mixture is overfired. Also, a fire powder having a lithium content of above 1.30 may be obtained. When such a fired powder reacts with a tungsten compound in a subsequent step, lithium carbonate may be generated due to the excess amount of lithium, and a greater amount of gas may be generated in a charge/discharge repetition process.

Any type of apparatus or method may be used to mix the nickel composite hydroxide or the like and the lithium compound as long as it is able to mix both uniformly. For example, a dry mixer such as a V blender, or a mixing/granulation apparatus may be used.

Then, as shown in FIG. 3, the obtained lithium mixture is fired in an oxidizing atmosphere to obtain lithium-nickel composite oxide particles (base material) (step S2).

The lithium mixture is fired at a temperature of 700° C. or more and 900° C. or less. Typically, lithium-nickel composite oxide particles (base material) can be produced by firing a lithium mixture at a temperature of above 500° C. However, if the firing temperature is below 700° C., lithium-nickel composite oxide particles having undeveloped and structurally unstable crystals are more likely to be produced. If such lithium-nickel composite oxide particles are used as a positive electrode active material, the crystal structure of the positive electrode active material is more likely to be broken due to phase transition caused by charge/discharge, or the like. Also, the primary particles may grow insufficiently, making the specific surface area or porosity of the lithium-nickel composite oxide particles too large.

If the firing temperature is above 900° C., cation mixing is more likely to occur. Thus, the layered structures in the crystals of the lithium-nickel composite oxide particles may collapse, making it difficult to insert and de-insert lithium ions. Also, the crystals of the lithium-nickel composite oxide particles may be decomposed, forming a nickel oxide or the like. Further, the lithium-nickel composite oxide particles may be sintered, forming bulky lithium-nickel composite oxide particles having too large an average particle size. Furthermore, the primary particles may grow such that the specific surface area or porosity becomes too small.

To increase the Ni content of the nickel composite hydroxide or the like to obtain a higher battery capacity, the lithium mixture is fired preferably at 700° C. or more and 780° C. or less, more preferably 730° C. or more and 760° C. or less. The time during which the lithium mixture is held at the above firing temperature is preferably about 1 h or more and 24 h or less, more preferably 2 h or more and 12 h or less. If the holding time is below 1 h, the lithium mixture may be insufficiently crystallized; if the holding time is above 6 h, firing may excessively proceed, causing cation mixing.

It is particularly preferred to fire the lithium mixture in two stages: one stage at a temperature of 400 to 600° C. for 1 to 5 h; and a subsequent stage at a temperature of 700 to 780° C. for 3 h or more. Firing the lithium mixture under these conditions allows for removal of water of crystallization or the like from the lithium compound, as well as allows for uniform reaction in a temperature range in which crystal growth of a lithium-nickel composite oxide proceeds.

To synthesize lithium-nickel composite oxide particles (base material), the firing atmosphere only has to be an oxidizing atmosphere. However, the firing atmosphere is preferably a mixed-gas atmosphere of 18% by volume or more and 100% by volume or less of oxygen and inert gas, more preferably a mixed-gas atmosphere having an oxygen concentration of 90% by volume or more, even more preferably an oxygen atmosphere (oxygen concentration 100%). Firing the lithium mixture in an atmosphere having an oxygen concentration of 18% by volume or more, that is, in an atmosphere having a higher oxygen content than an air atmosphere can improve the reactivity between the lithium compound and the nickel composite hydroxide or the like. Also, use of an atmosphere having an oxygen concentration of 90% by volume or more can further improve the reactivity and produce a lithium-nickel composite oxide having excellent crystallinity.

Any apparatus or method may be used to fire the lithium mixture. For example, there may be used a firing furnace, such as an electric furnace, kiln, tube furnace, or pusher furnace, that is able to maintain an oxygen atmosphere, or a gas atmosphere having an oxygen concentration of 18% by volume or more, such as a dehumidified, decarbonated dry air atmosphere.

Then, lithium-nickel composite oxide particles (base material) obtained after firing are cleaned with water to form a slurry, which is in turn cleaned with water and then solid-liquid separated to obtain a cleaned cake (step S3). The cleaned cake includes the cleaned lithium-nickel composite oxide particles (base material).

The lithium-nickel composite oxide particles (base material) obtained after firing have an unreacted lithium compound, that is, surplus lithium on the surface of the secondary particles or primary particles. In particular, if a nickel composite hydroxide or nickel composite oxide and a lithium compound are fired, obtained lithium-nickel composite oxide particles (base material) have a great amount of surplus lithium thereon. Surplus lithium or other impurity elements may degrade the battery characteristics. For this reason, the lithium-nickel composite oxide particles (base material) are cleaned with water so that surplus lithium or other impurity elements such as sulfate groups can be removed from the composite oxide particles.

Also, by performing water-cleaning, water necessary to promote the reaction between a lithium compound on the surface of the primary particles of the lithium-nickel composite oxide particles (base material) and a tungsten compound is supplied to the lithium-nickel composite oxide particles (base material).

Water-cleaning involves mixing the lithium-nickel composite oxide particles (base material) and water to form a slurry. The slurry concentration is preferably 500 g/L or more and 2500 g/L or less, more preferably 750 g/L or more and 2000 g/L or less, even more preferably 1000 g/L or more and 22000 g/L or less. As used herein, the term "slurry concentration" (g/L) refers to the mass (g) of composite oxide particles mixed with 1 L of water.

If the slurry concentration is below 500 g/L, even a lithium compound on the surface of the lithium-nickel composite oxide particles (base material) necessary to react with a tungsten compound may be cleaned off and thus the reaction between the lithium compound and the tungsten compound may not proceed sufficiently in a subsequent step. Also, if the slurry concentration is above 2500 g/L, an unreacted lithium compound or impurity elements than necessary may remain, resulting in degradation of the battery characteristics.

The water-cleaning temperature is preferably 10° C. or more and 40° C. or less, more preferably 20° C. or more and 30° C. or less. If the water-cleaning temperature is below 10° C., a greater amount of lithium compound than necessary may remain, resulting in degradation of the battery characteristics. Also, if the water-cleaning temperature is above 40° C., the lithium compound may be cleaned off excessively.

The water-cleaning time may be any length of time, but is preferably about 5 min or more and 60 min or less. If the water-cleaning time is short, the lithium compound or impurities on the surface of the lithium-nickel composite oxide powder may not be sufficiently removed but may remain. Also, if the water-cleaning time is increased, the cleaning effect would not be improved but rather productivity would be reduced.

The water used to form a slurry may be of any type. However, to prevent degradation of the battery characteristics due to adhesion of impurities to a positive electrode active material, the water is preferably water having an electric conductivity of below 10 µS/cm, more preferably water having an electric conductivity of 1 µS/cm or less.

The slurry obtained from water-cleaning may be solid-liquid separated using any method, including a commonly used apparatus or method. For example, an adsorption filter, centrifugal separator, or filter press is preferably used. By solid-liquid separating the slurry, a cleaned cake including the cleaned composite oxide particles is obtained.

The water content of the cleaned cake is preferably 2.0% by mass or more, more preferably 3.0% by mass or more and 15.0% by mass or less, more preferably 4.5% by mass or more and 11.5% by mass or less. If the water content is within the above range, the following can be performed in a first heat-treatment (to be discussed later): the tungsten compound is dissolved; and along with water, tungsten contained in the tungsten compound permeates the pores between the primary particles communicating with the outside of the secondary particles or imperfect grain boundaries so that a sufficient amount of tungsten can be dispersed on the surface of the primary particles.

If the water content is within the above lower limit, a sufficient mass of water can be obtained to promote the reaction between the lithium compound and tungsten compound on the surface of the cleaned composite oxide particles. Also, if the water content is within the above upper limit, slurrying of the cleaned cake and thus an increase in viscosity are suppressed, facilitating mixture of the cleaned cake and the tungsten compound. Further, the drying time can be reduced, further improving productivity. Also, if an obtained positive electrode active material is used as the positive electrode of a battery, degradation of battery characteristics due to elution of lithium from the lithium-nickel composite oxide particles can be further suppressed.

Then, the obtained cleaned cake and the tungsten compound that is substantially free of lithium are mixed to obtain a tungsten mixture (step S4). As used herein, the term "substantially free of lithium" means that the lithium content of the tungsten compound is, for example, 0.05% by mass or less, and the lithium content may be 0% by mass.

The tungsten compound is preferably water-soluble. A water-soluble tungsten compound powder is dissolved in water contained in a tungsten compound (water contained in the cleaned cake) so that tungsten can permeate the secondary particles to the extent that it reaches the surface of the primary particles inside the secondary particles.

The tungsten compound may be one that can be dissolved in water when heated during first and second heat-treatments (to be discussed later) even if it cannot be dissolved in water at room temperature. The tungsten compound may also be one that can be dissolved by reacting with a lithium compound on the surface of the lithium-nickel composite oxide particles (base material) to form lithium tungstate.

The dissolved tungsten compound only has to be present in an amount such that it can permeate the secondary particles to the extent that it reaches the surface of the primary particles inside the secondary particles. For this reason, the tungsten compound may be partially solidified after being mixed and after being heated. Since the water contained in the tungsten mixture becomes alkaline when lithium is eluted into the water, the tungsten compound may be a compound that can be dissolved in alkaline water.

Preferred examples of the tungsten compound include tungsten oxide, tungstic acid, ammonium paratungstate, and sodium tungstate. Among these, tungsten oxide ($WO_3$) or tungstic acid ($WO_3 \cdot H_2O$) is more preferred, since impurities are less likely to be mixed thereinto.

The amount of tungsten contained in the tungsten compound with respect to the sum of the atomic numbers of Ni, Co, and M contained in the lithium-nickel composite oxide particles (base material) is preferably more than 0% by atom and 3.0% by atom or less, more preferably 0.05 to 3.0% by atom, even more preferably 0.05 to 2.0% by atom, particularly preferably 0.08 to 1.0% by atom. If the amount of tungsten is within the above range, the amount of tungsten contained in a LW compound in a positive electrode active material can be controlled within a preferred range. Thus, both the charge/discharge capacity and output characteristics of the positive electrode active material can be increased in a more balanced manner.

The temperature at which the cleaned cake and the tungsten compound are mixed is preferably 50° C. or less. If the temperature is above 50° C., the amount of water required to promote the reaction between the lithium compound and the tungsten compound may not be obtained in the mixture, since the mixture dries during mixing. The lower limit of the temperature may be any temperature and may be, for example, 10° C. or more.

The cleaned cake and the tungsten compound may be mixed using any method. For example, the cleaned cake and the tungsten compound may be mixed sufficiently using a mixer to the extent that the skeleton of the lithium-nickel composite oxide is not broken. The mixer may be a typical mixer. For example, a shaker/mixer, Lodige mixer, Julia mixer, or V-blender may be used.

Then, as shown in FIG. 3, the tungsten mixture is heat-treated to obtain lithium-nickel composite oxide particles (base material) where tungsten is dispersed on the surface of the primary particles 2 and on the surface of and inside the secondary particles (first heat-treatment; step S5). In the first heat-treatment, it is important to dissolve the tungsten compound so that tungsten is dispersed on the surface of the primary particles.

Also, in the first heat-treatment, lithium in the lithium-nickel composite oxide particles (base material) may be eluted as lithium ions. Lithium (lithium ions) eluted in the tungsten mixture, or at least part of the lithium component remaining on the surface of the primary particles of the lithium-nickel composite oxide particles (base material) may react with a tungsten component that is free of lithium.

Use of a tungsten compound substantially free of lithium has an effect of drawing out lithium that is excessively present in the crystals of the lithium-nickel composite oxide particles (base material). The drawn-out lithium reacts with the tungsten component to increase the crystallinity of the lithium-nickel composite oxide particles. Thus, when the lithium-nickel composite oxide particles are used as the positive electrode of a battery, higher battery characteristics will be obtained.

In the first heat-treatment, the tungsten compound substantially free of lithium is dissolved in water in the tungsten mixture and thus can permeate the secondary particles to the extent that it reaches the pores between the primary particles or imperfect grain boundaries inside the secondary particles, as well as can disperse tungsten on the surface of the secondary particles and on the surface of the primary particles inside the secondary particles.

The temperature at which the first heat-treatment is performed is preferably 60° C. or more and 80° C. or less. If the heat-treatment temperature is below 60° C., the tungsten compound may not be sufficiently dissolved and thus tungsten may not be sufficiently dispersed. In this case, the lithium compound and the tungsten compound present on the surface of the primary particles of the composite oxide may not sufficiently react with each other. Also, if the heat-treatment temperature is above 80° C., water may evaporate too fast. In this case, the reaction between the lithium compound and the tungsten compound present on the surface of the primary particles or the permeation of tungsten may not sufficiently proceed.

The time during which the first heat-treatment is performed may be any length of time. However, to cause tungsten to permeate the secondary particles sufficiently, the heat-treatment time is preferably 0.5 h or more and 2 h or less.

Then, as shown in FIG. 3, a heat-treatment is performed at a higher temperature than in the first heat-treatment to obtain lithium-nickel composite oxide particles where an LW compound is formed on the surface of the primary particles and on the surface of and inside the secondary particles (second heat-treatment; step S6). The second heat-treatment involves performing a heat-treatment at a higher temperature than in the first heat-treatment to sufficiently evaporate water in the tungsten mixture and thus to form an LW compound on the surface of the primary particles and on the surface of and inside the secondary particles in the lithium-nickel composite oxide particles. The LW compound is formed by the reaction between the lithium compound and tungsten compound dissolved in water. The formation of the LW compound allows for production of a positive electrode active material having significantly reduced surplus lithium and improved battery characteristics.

The temperature at which the second heat-treatment is performed is preferably 100° C. or more and 200° C. or less. If the heat-treatment temperature is below 100° C., water in the tungsten mixture may not sufficiently evaporate, failing to form a sufficient amount of LW compound. Also, if the heat-treatment temperature is above 200° C., the composite oxide particles may be necked together with the LW compound therebetween, or the specific surface area of the composite oxide particles may be significantly reduced. Thus, the battery characteristics may be degraded.

The time during which the second heat-treatment is performed may be any length of time, but is preferably 1 h or more and 15 h or less, more preferably 5 h or more and 12 h or less. If the heat-treatment time is within the above range, water in the tungsten mixture can be sufficiently evaporated, forming an LW compound.

The atmosphere in which the first and second heat-treatments are performed is preferably a decarboxylated air atmosphere, an inert gas atmosphere, or a vacuum atmosphere. Use of such an atmosphere allows for avoidance of the reaction between water or carbonic acid contained in the atmosphere and lithium on the surface of the composite oxide particles.

3. Nonaqueous Electrolyte Secondary Battery

A nonaqueous electrolyte secondary battery of the present embodiment (also referred to as "secondary battery") includes a positive electrode including the above positive electrode active material. The nonaqueous electrolyte secondary battery of the present embodiment can be made up of elements similar to those of a conventionally known nonaqueous electrolyte secondary battery and includes, for example, a positive electrode, a negative electrode, and a nonaqueous electrolyte solution. The nonaqueous electrolyte secondary battery of the present embodiment below is illustrative only, and various changes or modifications can be made thereto on the basis of the embodiment described in the present specification, as well as on the basis of the knowledge of those skilled in the art. The nonaqueous electrolyte secondary battery of the present embodiment may be used for any application.

(1) Positive Electrode

The positive electrode may be produced using any method, including conventionally known methods, and can be produced, for example, in the following manner.

The above positive electrode active material, a conductive material, a binder, and optionally activated carbon or a solvent for viscosity adjustment or other purposes are mixed and kneaded to prepare a positive electrode mixture material paste. The mixing ratio among the components of the positive electrode mixture material paste may be any ratio and can be adjusted properly in accordance with the required performance of the nonaqueous electrolyte secondary battery. For example, as with the positive electrode of a typical nonaqueous electrolyte secondary battery, the positive electrode mixture material paste may contain 60 to 95 parts by mass of the positive electrode active material, 1 to 20 parts by mass of the conductive material, and 1 to 20 parts by mass of the binder with respect to the total mass of the solid component of the positive electrode mixture material except for the solvent of 100 parts by mass.

The prepared positive electrode mixture material paste is applied to the surface of an aluminum-foil collector and dried to scatter the solvent. Thus, a sheet-shaped positive electrode is prepared. Optionally, the applied positive electrode mixture material paste may be pressed using a roll press or the like to increase the electrode density. The sheet-shaped positive electrode can be used to produce the target battery, for example, by cutting it into a size suitable for the battery. Note that the positive electrode production method described above is illustrative only and other methods may be used.

Examples of the conductive material used to produce the positive electrode include graphite (natural graphite, artificial graphite, expanded graphite, etc.) and carbon black-based materials, such as acetylene black and Ketjen Black®.

The binder used in the positive electrode has the function of binding active material particles together. Examples of the binder include polyvinylidene fluoride (PVDF), polytetrafluoroethylene (PTFE), fluororubber, ethylene propylene diene rubber, styrene butadiene, cellulose-based resin, and polyacrylic acid.

Optionally, a solvent may be added to the positive electrode mixture material. A solvent disperses the positive electrode active material, the conductive material, and activated carbon and dissolves the binder. Examples of a solvent include organic solvents, such as N-methyl-2-pyrrolidone. Also, activated carbon, which is able to increase the electric double-layer capacity, may be added to the positive electrode mixture material.

(2) Negative Electrode

The negative electrode may be of any type and may be a conventionally known negative electrode. The negative electrode is formed, for example, by mixing a binder with metal lithium, lithium alloy, or the like or a negative electrode active material which can insert and de-insert lithium ions, adding an appropriate solvent to the mixture, applying the resulting pasty negative electrode mixture material onto a metal-foil collector formed of copper or the like, drying the mixture material, and optionally compressing it to increase the electrode density.

Examples of a negative electrode active material that can insert and de-insert lithium ions include natural graphite, artificial graphite, a fired body of an organic compound such as phenol resin, and a powder of a carbon material such as coke. As in the positive electrode, the negative electrode binder may be, for example, a fluorine-containing resin, such as PVDF. The solvent to disperse the active material and the binder may be an organic solvent, such as N-methyl-2-pyrrolidone.

(3) Separator

The separator is disposed so as to be sandwiched between the positive electrode and the negative electrode. The separator separates the positive electrode and the negative electrode and holds the electrolyte. The separator may be of any type and may be a conventionally known one. The separator may be, for example, a porous film formed of a polyolefin such as polyethylene or polypropylene, or a porous film containing a material other than polyolefin, such as heat-resistant rubber or heat-resistant resin, as a main component.

(4) Nonaqueous Electrolyte Solution

The nonaqueous electrolyte solution is prepared by dissolving a lithium salt serving as a supporting electrolyte in an organic solvent. The organic solvent may be, for example, one or combinations of two or more selected from cyclic carbonates such as ethylene carbonate, propylene carbonate, butylene carbonate, and trifluoropropylene carbonate, chain carbonates such as diethyl carbonate, dimethyl carbonate, ethylmethyl carbonate, and dipropyl carbonate, ether compounds such as tetrahydrofuran, 2-methyltetrahydrofuran, and dimethoxyethane, sulfur compounds such as ethyl methyl sulfone and butanesultone, phosphorus compounds such as triethyl phosphate and trioctyl phosphate, and the like.

Examples of the lithium salt include $LiPF_6$, $LiBF_4$, $LiClO_4$, $LiAsF_6$, $LiN(CF_3SO_2)_2$, and composite salts thereof. The nonaqueous electrolyte solution may contain a radical scavenger, a surfactant, a flame retardant, or the like.

(5) Shape and Configuration of Battery

The secondary battery of the present embodiment may have any shape, including conventionally known shapes, and may have, for example, a cylindrical shape or layered shaped. Whatever shape it may take, the secondary battery is assembled by stacking the positive electrode and the negative electrode with the separator therebetween to form an electrode body, impregnating the electrode body with the nonaqueous electrolyte solution, connecting a positive electrode collector and a positive electrode terminal leading to the outside, and a negative electrode collector and a negative electrode terminal leading to the outside using collection leads or the like, and hermetically sealing these components in a battery case.

(6) Characteristics

The secondary battery of the present embodiment has a high capacity and produces high output. If a nonaqueous electrolyte secondary battery using the above positive electrode active material is used as the positive electrode of a 2032-type coin battery, a high initial discharge capacity of 165 mAh/g or more can be obtained. Also, the secondary battery of the present embodiment has a low positive electrode resistance and a high capacity and produces high output. Further, the secondary battery of the present embodiment has high thermal stability.

Figure 5:
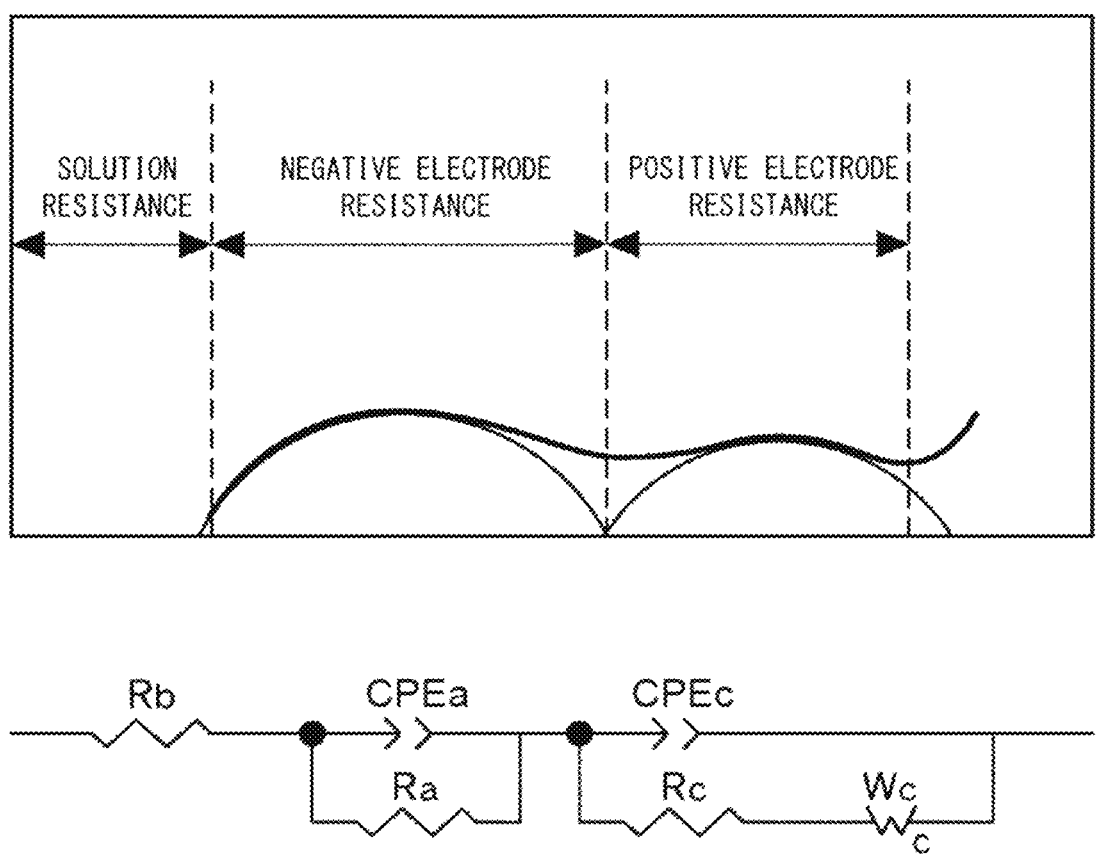
FIG. 5 is a schematic diagram showing an example of an impedance evaluation measurement and an equivalent circuit used for analysis.

An example of a method to measure the positive electrode resistance is as follow. By measuring the frequency dependence of battery reaction using a typical AC impedance method, which is an electrochemical evaluation technique, there is obtained a Nyquist diagram based on the solution resistance, the negative electrode resistance and negative electrode capacity, and the positive electrode resistance and positive electrode capacity, as shown in FIG. 5.

The battery reaction of the electrodes includes resistance components associated with charge migration and capacitance components based on an electrical double layer. By representing these components using an electrical circuit, a parallel circuit of resistances and capacitances is obtained. The entire battery is represented by an equivalent circuit in which the solution resistance and a parallel circuit of the negative electrode and the positive electrode are connected in series.

By performing a fitting calculation on the Nyquist diagram measured using this equivalent circuit, the resistance components and the capacitance components can be estimated. The positive electrode resistance is equal to the diameter of a semicircle on the low frequency side in the obtained Nyquist diagram. As seen above, the positive electrode resistance can be estimated by measuring the AC impedance of the prepared positive electrode and performing a fitting calculation on the obtained Nyquist diagram using the equivalent circuit.

EXAMPLES

Now, using Examples, the present invention will be described in detail. However, the present invention is not limited thereto.

1. PRODUCTION AND EVALUATION OF BATTERY

Figure 6:
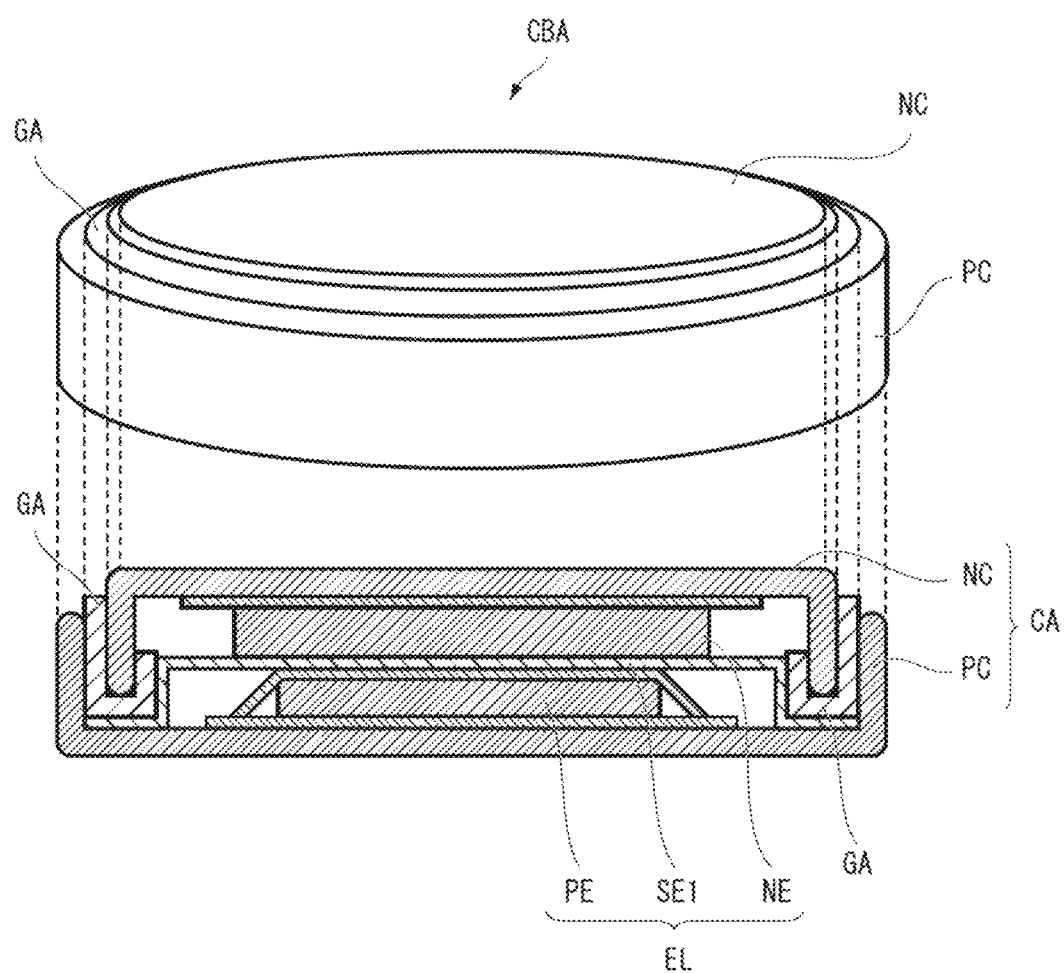
FIG. 6 is a schematic sectional view of a coin battery used to evaluate a battery.
Figure 7:
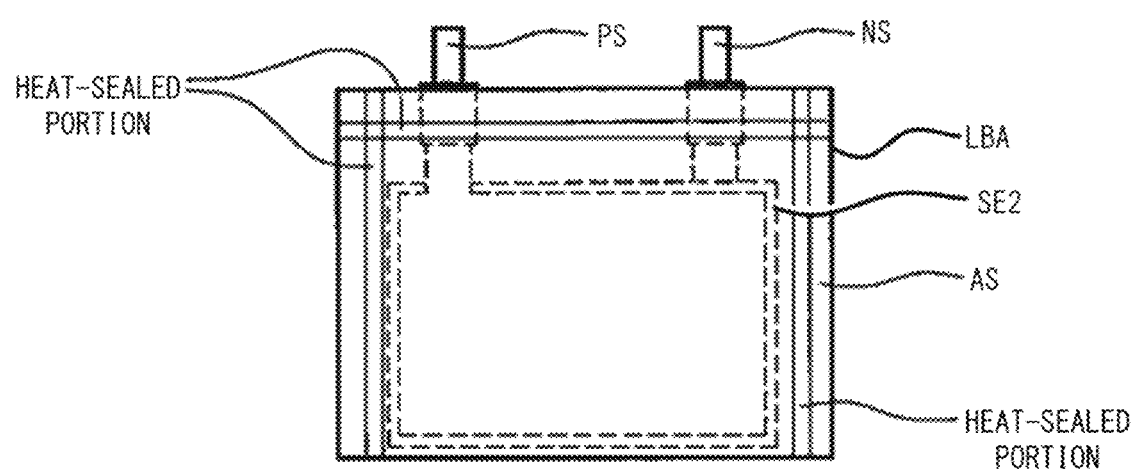
FIG. 7 is a schematic view of a laminate battery used to evaluate a battery.

Secondary batteries using positive electrode active materials obtained according to the present embodiment were measured for the performance thereof (initial discharge capacity, positive electrode resistance, the amount of generated gas). FIG. 6 is a drawing showing a 2032-type coin battery CBA (also referred to as "coin battery") used to evaluate the initial discharge capacity and positive electrode resistance of the positive electrode active materials. FIG. 7 is a drawing showing a laminate battery LBA used to evaluate the amount of gas generated in the positive electrode active materials.

(1) Coin Battery

As shown in FIG. 6, the coin battery CBA includes an electrode EL and a case CA containing the electrode EL. The electrode EL includes a positive electrode PEL, a separator SE1, and a negative electrode NEL which are stacked in this order. The positive electrode PEL and the negative electrode NEL are contained in the case CA such that the positive electrode PEL is in contact with the inner surface of a positive electrode can PC and the negative electrode NEL is in contact with the inner surface of a negative electrode can NC.

The case CA includes the hollow positive electrode can PC whose one end is an opening and the negative electrode can NC disposed in the opening of the positive electrode can PC. The case CA is configured such that when the negative electrode can NC is disposed in the opening of the positive electrode can PC, a space for containing the electrode EL is formed between the negative electrode can NC and the positive electrode can PC. The case CA includes a gasket GA. The gasket GA prevents the relative movement between the positive electrode can PC and the negative electrode can NC so that these cans are kept in non-contact with each other. The gasket GA also has a function of tightly sealing the gap between the positive electrode can PC and the negative electrode can NC to block the movement of air and fluid between the inside and outside of the case CA.

The coin battery CBA was produced as follows.

Fifty-two point five mg of a positive electrode active material, 15 mg of acetylene black, and 7.5 mg of polytetrafluoroethylene (PTFE) were mixed and press-molded at a pressure of 100 MPa to obtain a positive electrode PE having a diameter of 11 mm and a thickness of 100 μm. The obtained positive electrode PE was dried in a vacuum drier at 120° C. for 12 h.

Used as a negative electrode NE was a negative electrode sheet formed by applying a graphite powder having an average particle size of about 20 μm and polyvinylidene fluoride to a punched-out, disc-shaped copper foil having a diameter of 14 mm. Used as a separator SE1 was a 25 μm-thick porous polyethylene film. Used as an electrolyte solution was an equal amount mixed solution of ethylene carbonate (EC) and diethyl carbonate (DEC) using 1M of $LiClO_4$ as a supporting electrolyte (available from TOMIYAMA PURE CHEMICAL INDUSTRIES, Ltd.).

Using the positive electrode PE, the negative electrode NE, the separator SE1, and the electrolyte solution (not shown), a coin battery CBA shown in FIG. 6 was produced in an Ar-atmosphere glove box in which the dew point was controlled to −80° C.

(2) Evaluation of Initial Discharge Capacity and Positive Electrode Resistance

The initial discharge capacity and the positive electrode resistance representing the performance of the produced coin battery CBA were evaluated as follows. The initial discharge capacity was obtained as follows: the produced coin battery BA was left alone for about 24 hours; after an open circuit voltage (OCV) was stabilized, the current density with respect to the positive electrode was set to 0.1 mA/cm$^2$; the coin battery CBA was charged to a cut-off voltage of 4.3 V; after left at rest for one hour, the coin battery CBA was discharged to a cut-off voltage 3.0 V; and the then capacity thereof was regarded as the initial discharge capacity.

The positive electrode resistance was obtained as follows: the produced coin battery CBA was charged at a charge potential of 4.1 V and measured using a frequency response analyzer and a potentio-galvanostat (1255B available from Solartron Analytical) and using AC impedance method; thus, a Nyquist plot shown in FIG. 5 was obtained; this Nyquist plot represents the sum of characteristic curves showing the solution resistance, the resistance and capacitance of the negative electrode, and the resistance and capacitance of the positive electrode; and for this reason, by performing a fitting calculation using an equivalent circuit based on this Nyquist plot, the positive electrode resistance value was calculated.

(3) Laminate Battery (Laminate Cell)

To evaluate the amount of gas generated in the positive electrode active materials, the laminate battery LBA shown in FIG. 7 was used.

The laminate battery LBA was produced as follows: first, a pasty positive electrode active material was applied to an aluminum collector foil (thickness 0.02 mm) except for a conductive part connected to the outside and dried to prepare a positive electrode sheet PS in which a positive electrode active material layer having a mass per unit area of 7 mg/cm² is formed; a pasty carbon powder (acetylene black) serving as a negative electrode active material was applied to a copper collector foil (thickness 0.02 mm) to prepare a negative electrode sheet NS in which a negative electrode active material layer having a mass per unit area of 5 mg/cm² is formed; a separator SE2 formed of a polypropylene microporous film (thickness 20.7 μm; porosity density 43.9%) was inserted between the prepared positive electrode sheet PS and negative electrode sheet NS to form a multilayer sheet; the multilayer sheet was sandwiched between two aluminum laminate sheets AS (thickness 0.05 mm); and three sides of the aluminum laminate sheets AS were heat-sealed to assemble a laminate battery LBA configured as shown in FIG. 7.

Then, 260 μl of an electrolyte solution (available from UBE INDUSTRIES, LTD.) obtained by dissolving $LiPF_6$ (1 mol/L) and cyclohexylbenzene (2 wt %) in a mixed solvent of ethylene carbonate, ethyl methyl carbonate, and dimethyl carbonate (volume ratio 3:3:4) was charged into the laminate battery LBA; and the remaining one side was heat-sealed to produce a laminate battery LBA as shown in FIG. 7. The produced laminate battery LBA had a height of 60 mm and a width of 90 mm.

(4) Evaluation of Amount of Generated Gas
Test Conditions

The produced laminate battery LBA was stored in a thermostatic bath (Cosmopia available from Hitachi Appliances, Inc.) whose temperature was set to 25° C., for 12 h.

After the 12-h storage, the laminate battery LBA contained in the thermostatic bath was charged and discharged in a range of 3.0 to 4.3 V in a 0.2 C constant current mode three times using a charger/discharger (HJ1001SD8 available from HOKUTO DENKO CORP.). After the charges and discharges, the laminate battery LBA was charged to 4.6 V in a 1 C constant current mode and then left alone in the thermostatic bath for 72 h to generate a gas in the laminate battery LBA. At this time, the laminate battery LBA was sandwiched and held between a pair of plate-shaped members (available from SUS Corporation), and a 1 cm-wide end portion of the laminate battery LBA was exposed as an exposure portion from the pair of plate-shaped members.

Evaluation of Amount of Generated Gas

Figure 8:
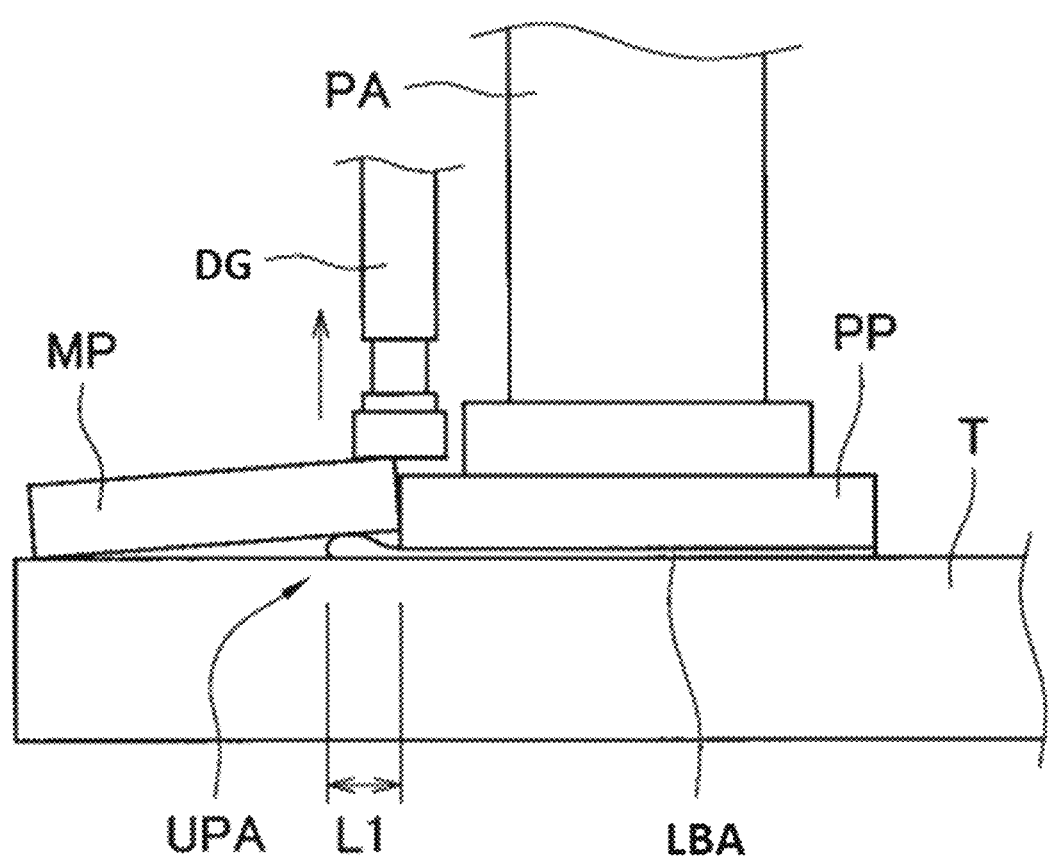
FIG. 8 is a schematic view showing a method for evaluating the amount of gas generated by pressing the laminate battery using an oil hydraulic press.

The laminate battery LBA, which was subjected to the gas generation test, was taken out of the thermostatic bath, and a mark was made at a point distant by 1 cm from the end on the laminate battery LBA using an oil-based Magic Marker. Then, as shown in FIG. 8, the laminate battery LBA was placed on the table T of a hand-operated oil hydraulic press (TB-50H PA4 available from NPa SYSTEM CO., LTD.). A rectangular-parallelepiped presser plate (available from SUS Corporation) serving as a pressing member PP was placed on the laminate battery LBA except for the 1 cm-wide end portion (a portion L1 from the mark to the end of the laminate cell; unpressed portion UPA). A rectangular-parallelepiped measurement plate (available from SUS Corporation) serving as a placement member MP was placed on the unpressed portion UPA. A dial gauge DG (2A-104 available from CITIZEN WATCH CO., LTD.) was placed on the upper surface of one end (a portion placed on the unpressed portion) of the measurement plate.

Then, as shown in FIG. 8, the pressing member PP was pressed at a pressure of 4 kN using the hand-operated hydraulic press PA. Thus, the gas in the laminate battery LBA was collected to the unpressed portion UPA, which was then expanded, and one end of the placement member MP was moved upward. Finally, the amount of movement of the one end of the placement member MP was measured by reading the value of the dial gauge DG, and the amount of generated gas was evaluated.

In Examples below, special-grade chemicals (available from FUJIFILM Wako Pure Chemical Corporation) were used to produce composite hydroxides, positive electrode active materials, and secondary batteries.

2. EXAMPLES AND COMPARATIVE EXAMPLES

Example 1

Preparation of Nickel Composite Oxide/Hydroxide

First, water was charged into a reaction bath (5 L) until half the volume of the reaction bath was reached, and the temperature in the bath was set to 50° C. while stirring the water. At this time, a nitrogen atmosphere (oxygen concentration: 1% by volume or less) was used in the reaction bath. Twenty-five percent by mass of an aqueous solution of sodium hydroxide and 25% by mass of ammonia water in proper amounts were added to the water in the reaction bath so that pH value in the reaction bath becomes 13.0 on a 25° C. solution temperature basis and the ammonia concentration becomes 13 g/L. Also, hydrates of nickel sulfate and cobalt sulfate were dissolved in pure water so that the molar ratio between nickel and cobalt becomes 94:6, to prepare 2.0 mol/L of a raw-material aqueous solution. This raw-material aqueous solution and sodium aluminate (5.5 mol/L on an aluminum basis) were added dropwise to the reaction bath at constant speed to obtain a reaction solution where the molar ratio between nickel, cobalt, and aluminum is 91:6:3. The total concentration of Ni, Co, and Al salts in the reaction solution was set to 2.2 mol/L. Simultaneously, 25% by mass of ammonia water and 25% by mass of an aqueous solution of sodium hydroxide were also added dropwise at constant speed so that the pH value of the reaction solution is controlled to 13.0 on a 25° C. solution temperature basis and the ammonia concentration is controlled to 13 g/L, to crystallize nickel composite hydroxide particles (step S10). Then, the nickel composite hydroxide slurry was filtered to recover a cake (step S11). The recovered cake was cleaned with water (step S12) and filtered again and dried (step S13) to obtain a nickel composite hydroxide.

The composition of the obtained nickel composite hydroxide was analyzed using an ICP emission spectrometer (725ES available from Varian Medical Systems, Inc.). As a result, the nickel composite hydroxide was found to be represented by $Ni_{0.91}Co_{0.06}Al_{0.03}$ $(OH)_2$, and the sulfate group content was found to be 1.7% by mass. Also, the mean volume diameter (MV) of the nickel composite hydroxide was measured using a laser diffraction/scattering particle size analyzer (Microtrac MT3000II available from Nikkiso Co., Ltd.) and was found to be 19.0 μm.

Preparation of Nickel Composite Oxide

The nickel composite hydroxide obtained in the crystallization step was fired at an oxidizing-roasting temperature of 600° C. in an air atmosphere for 1 h to obtain a nickel composite oxide (oxidizing-roasting). The composition of the obtained nickel composite oxide was analyzed using an ICP emission spectrometer (725ES available from Varian Medical Systems, Inc.). As a result, the nickel composite oxide was found to be represented by $Ni_{0.91}Co_{0.06}Al_{0.03}O_2$.

Production of Positive Electrode Active Material

Thirty-three point five g of lithium hydroxide was added to the nickel composite oxide so that the ratio of the atomic number of Li to the sum of the atomic numbers of Ni, Co, and Al contained in 100 g of the nickel composite oxide becomes 1.050 and sufficiently mixed using a shaker/mixer [available from TURBURA Type T2C Willy A. Bachofen AG (WAB)] to obtain a lithium mixture (step S1).

The obtained lithium mixture was put into a firing container made of magnesia, heated to 750° C. in a 100%-oxygen air current, and fired for 10 h and then the container was cooled to room temperature. The resulting lithium mixture was crushed and sifted through a sieve having an aperture of 38 μm to obtain lithium-nickel composite oxide particles serving as a base material (step S2). The ratio of the atomic number of Li to the sum of the atomic numbers of Ni, Co, and Al contained in the obtained lithium-nickel composite oxide particles was analyzed using ICP method and was found to be 1.048.

The lithium-nickel composite oxide particles (base material) obtained in the firing step was cleaned with 25° C. pure water for 20 min to obtain 1000 g/L of slurry. Then, the slurry was solid-liquid separated using a Nutsche to obtain a cleaned cake (step S3). The water content of the cleaned cake was 5.2% by mass.

Zero point three six g of tungstic oxide was added to the cleaned cake so that the atomic number of W with respect to the sum of the atomic numbers of Ni, Co, and Al contained in 100 g of the cleaned cake becomes 0.15% by atom and sufficiently mixed using a shaker/mixer [TURBURA Type T2C available from Willy A. Bachofen AG (WAB)] to obtain a tungsten mixture (step S4).

The obtained tungsten mixture was put into an aluminum bag, nitrogen-gas purged, then laminated, and placed in a dryer heated to 80° C. for about 1 h (step S5). The heated tungsten mixture was taken out of the aluminum bag, put into a container (available from SUS Corporation), left alone and dried using a vacuum dryer heated to 190° C. for 10 h (step S6) and then the container was cooled. Finally, the tungsten mixture was sifted through a sieve having an aperture of 38 μm and crushed to obtain a positive electrode active material consisting of lithium-nickel composite oxide particles having a lithium-tungsten compound on the surface of primary particles.

The obtained positive electrode active material was analyzed using ICP method. The ratio between Ni, Co, and Al was found to be 91:6:3; the ratio of the atomic number of Li to the sum of the atomic numbers of Ni, Co, and Al was found to be 0.981; the content of tungsten with respect to the sum of the atomic numbers of Ni, Co, and Al was found to be 0.15% by atom; and the sulfate group content was found to be 0.07% by mass.

The mean volume diameter (MV) of this positive electrode active material was measured using a laser diffraction/scattering particle size analyzer (Microtrac MT3000II available from Nikkiso Co., Ltd.) and was found to be 18.7 μm. Also, a predetermined amount of this positive electrode active material was charged into a measurement graduated cylinder and tapped 500 times using a tap density measurement instrument (KRS-406 available from Kuramochi Scientific Instruments Co., Ltd.). Then, (powder weight)/(powder volume) was calculated and found to be 2.60 g/cm³.

This positive electrode active material was embedded in a resin and polished using a cross-section polisher, and a cross-section thereof was observed using a 5000× scanning electron microscope (SEM). Then, the total area of any 20 or more secondary particles was measured using image analysis software (WinRoof 6.1.1) while detecting pores and dense portions as black portions and white portions, respectively, in the outline of the secondary particles, and the area ratio [black portions/(black portions+white portions)] was calculated as the porosity of the sheet-shaped resin and was found to be 3.6%.

Analysis of Lithium Tungstate and Surplus Lithium

The presence state of the lithium-tungsten compound in the obtained positive electrode active material was evaluated by titrating Li eluted from the positive electrode active material. Pure water was added to the obtained positive electrode active material, stirred for a predetermined time, and then filtered. Then, hydrochloric acid was added to the solution while measuring the pH of the filtrate, and the compound state of eluted lithium was evaluated from the resulting point of neutralization. The lithium-tungsten compound was found to be lithium tungstate, and $Li_4WO_5$ was found to be present in the lithium tungstate. The abundance ratio of the contained $Li_4WO_5$ was calculated as 60 mol %. The amount of surplus lithium with respect to the total amount of positive electrode active material was 0.03% by mass.

Form Analysis of Lithium Tungstate

The obtained positive electrode active material was embedded in a resin and polished using a cross-section polisher, and a cross-section thereof was observed using a 30,000×SEM. The positive electrode active material was found to consist of primary particles and secondary particles formed by agglomeration of the primary particles, and particles of lithium tungstate were found to be formed on the surface of the primary particles. The sizes of the particles were 15 to 130 nm.

Also, the surface of the primary particles of the obtained positive electrode active material and the vicinity of the surface were observed using a transmission electron microscope (TEM), and 1 to 80 nm-thick coatings of lithium tungstate were found to be formed on the surface of the primary particles.

Evaluation of Batteries

A coin battery CBA shown in FIG. 6 including a positive electrode produced using the obtained positive electrode active material was evaluated for battery characteristics. The evaluation value of each positive electrode resistance was calculated as a relative value when that of Example 1 is "1.00." The initial discharge capacity was 222 mAh/g.

Evaluation of Amount of Generated Gas

A laminate battery LBA using the obtained positive electrode active material as a positive electrode material was produced, and the amount of generated gas was evaluated using a relative value when that of Example 1 is 100.

In the following Examples and Comparative Examples, only materials or conditions different from those in Example 1 will be described. The initial discharge capacity and positive electrode resistance of Example 1 are shown in Table 1.

Example 2

A positive electrode active material was obtained as in Example 1 except that a nickel composite hydroxide cake was cleaned with 1.2% by mass of an aqueous solution of sodium hydroxide, then cleaned with water, filtered, and dried to obtain a nickel composite hydroxide, and then evaluated for battery characteristics. As in Example 1, particles of lithium tungstate and coatings were found to be formed on the surface of the primary particles. The results are shown in Table 1.

Example 3

A positive electrode active material was obtained as in Example 1 except that a nickel composite hydroxide cake was cleaned with 3.3% by mass of an aqueous solution of sodium hydroxide, then cleaned with water, filtered, and dried to obtain a nickel composite hydroxide, and then evaluated for battery characteristics. As in Example 1, particles of lithium tungstate and coatings were found to be formed on the surface of the primary particles. The results are shown in Table 1.

Example 4

A positive electrode active material was obtained as in Example 1 except that 32.5 g of lithium hydroxide was added so that the ratio of the atomic number of Li to the sum of the atomic numbers of Ni, Co, and Al contained in 100 g of a nickel composite oxide becomes 1.030, and then evaluated for battery characteristics. As in Example 1, particles of lithium tungstate and coatings were found to be formed on the surface of the primary particles. The results are shown in Table 1.

Example 5

A positive electrode active material was obtained as in Example 1 except that 34.0 g of lithium hydroxide was added so that the ratio of the atomic number of Li to the sum of the atomic numbers of Ni, Co, and Al contained in 100 g of a nickel composite oxide becomes 1.070, and then evaluated for battery characteristics. As in Example 1, particles of lithium tungstate and coatings were found to be formed on the surface of the primary particles. The results are shown in Table 1.

Comparative Example 1

A positive electrode active material was obtained as in Example 1 except that tungsten oxide is not added to a cleaned cake, and then evaluated for battery characteristics. The results are shown in Table 1.

Comparative Example 2

A positive electrode active material was obtained as in Example 1 except that a nickel composite hydroxide cake was cleaned with 8.0% by mass of an aqueous solution of sodium hydroxide, then cleaned with water, filtered, and dried to obtain a nickel composite hydroxide and that tungsten oxide was not added to the cleaned cake, and then evaluated for battery characteristics. The results are shown in Table 1.

Comparative Example 3

A positive electrode active material was obtained as in Example 1 except that a nickel composite hydroxide cake was cleaned with 8.0% by mass of an aqueous solution of sodium hydroxide, then cleaned with water, filtered, and dried to obtain a nickel composite hydroxide, and then evaluated for battery characteristics. While particles of lithium tungstate and coatings were found to be formed on the surface of the secondary particles, lithium tungstate was not found in the secondary particles. The results are shown in Table 1.

Comparative Example 4

A positive electrode active material was obtained as in Example 1 except that the sulfate group content was set to 2.8% by mass by adjusting the amount of water used to clean a nickel composite hydroxide cake, and then evaluated for battery characteristics. The results are shown in Table 1.

Comparative Example 5

A positive electrode active material was obtained as in Example 1 except that a nickel composite hydroxide cake was cleaned with 12.5% by mass of an aqueous solution of sodium hydroxide, then cleaned with water, filtered, and dried to obtain a nickel composite hydroxide, and then evaluated for battery characteristics. While particles of lithium tungstate and coatings were found to be formed on the surface of the secondary particles, lithium tungstate was not found in the secondary particles. The results are shown in Table 1.

TABLE 1

| | Positive electrode active material | | | | | | | | | | | |
|---|---|---|---|---|---|---|---|---|---|---|---|---|
| | Hydroxide $SO_4$ content [wt %] | Li/Me before water-cleaning [—] | W/Me (×100%) [mol %] | Li/Me after water-cleaning [—] | $SO_4$ content [wt %] | Average particle size [μm] | Porosity [%] | Tap density [g/cm³] | Initial discharge capacity [mAh/g] | Positive electrode resistance [—] | Surplus lithium [wt %] | Amount of generated gas [—] |
| Example 1 | 1.7 | 1.048 | 0.15 | 0.981 | 0.07 | 18.7 | 3.6 | 2.60 | 222 | 1.00 | 0.03 | 100 |
| Example 2 | 0.95 | 1.047 | 0.15 | 0.984 | 0.05 | 18.9 | 1.9 | 2.61 | 220 | 1.02 | 0.02 | 95 |
| Example 3 | 0.47 | 1.049 | 0.15 | 0.986 | 0.03 | 18.6 | 1.2 | 2.62 | 219 | 1.05 | 0.02 | 93 |
| Example 4 | 1.7 | 1.029 | 0.15 | 0.971 | 0.09 | 18.5 | 2.5 | 2.61 | 220 | 1.10 | 0.03 | 96 |
| Example 5 | 1.7 | 1.068 | 0.15 | 0.999 | 0.07 | 19.0 | 4.2 | 2.55 | 222 | 0.94 | 0.05 | 103 |
| Comparative Example 1 | 1.7 | 1.048 | — | 0.987 | 0.08 | 18.7 | 3.8 | 2.45 | 216 | 1.31 | 0.24 | 150 |
| Comparative Example 2 | 0.16 | 1.048 | — | 0.991 | <0.01 | 18.9 | 0.28 | 2.62 | 205 | 5.25 | 0.11 | 130 |
| Comparative Example 3 | 0.16 | 1.048 | 0.15 | 0.991 | <0.01 | 18.9 | 0.28 | 2.59 | 212 | 2.25 | 0.03 | 91 |
| Comparative Example 4 | 2.8 | 1.084 | 0.15 | 1.011 | 0.16 | 19.1 | 5.9 | 2.40 | 215 | 1.21 | 0.10 | 115 |
| Comparative Example 5 | 0.08 | 1.048 | 0.15 | 0.994 | <0.01 | 18.8 | 0.10 | 2.60 | 210 | 2.90 | 0.02 | 90 |

Example

Comparative Example

Evaluation

As is apparent in Table 1, the positive electrode active materials of Examples have higher initial discharge capacities and lower positive electrode resistances than those of Comparative Examples. FIG. 2 shows an example of the result of a cross-sectional SEM observation of a positive electrode active material obtained in Examples of the present invention. It was found that the obtained positive electrode active material consists of primary particles and secondary particles formed by agglomeration of the primary particles and that an LW compound is formed on the surface of the secondary particles and on the surface of the primary particles inside the secondary particles in the form of particles or thin films. In FIG. 2, the positions in which the LW compound was identified are shown by arrows.

On the other hand, the positive electrode active material of Comparative Example 1 did not have the LW compound of the present invention on the surface of the primary particles or the surface of the secondary particles and therefore had a high positive electrode resistance and has difficulty in satisfying the output increase requirement. The positive electrode active material of Comparative Example 2 had a low porosity in the secondary particles and therefore had a high positive electrode resistance and has difficulty in satisfying the output increase requirement. The positive electrode active materials of Comparative Examples 3 and 5 included less pores and therefore were not found to have lithium tungstate in the secondary particles and had high positive electrode resistances. The positive electrode active material of Comparative Example 4 had more pores, and the amount of added lithium tungstate was small. Thus, the surface and inside of the secondary particles were not coated sufficiently, and the positive electrode resistance was high.

INDUSTRIAL APPLICABILITY

The nonaqueous electrolyte secondary battery of the present invention is preferable as a power supply for small portable electronic devices (notebook personal computers, mobile phones, etc.), which is always required to have a high capacity, as well as is preferable as a battery for electric vehicles, which is required to produce high output. The nonaqueous electrolyte secondary battery of the present invention suppresses gas generation during high-temperature storage, can be downsized, and is able to produce high output and therefore is preferable as a power supply for electric vehicles, whose mounting space is limited. Also, the present invention can be used not only as a power supply for electric vehicles, which are driven purely by electric energy, but also as a power supply for so-called "hybrid vehicles," which use also a combustion engine such as a gasoline engine or diesel engine.

The contents of Japanese Patent Application No. 2015-212318 and all documents cited in the above embodiment or the like are incorporated herein by reference as a part of the present description to the extent permitted by law.

DESCRIPTION OF REFERENCE SIGNS

1 . . . positive electrode active material
2 . . . primary particle
3 . . . pore
4 . . . secondary particle
5 . . . lithium-nickel composite oxide particles
6 . . . lithium-tungsten compound
6a . . . lithium-tungsten compound particle (on the surface of secondary particles)
6b . . . lithium-tungsten compound particle (inside secondary particles)
6c . . . lithium-tungsten compound coating
CBA . . . coin battery
CA . . . case
PC . . . positive electrode can
NC . . . negative electrode can
GA . . . gasket
EL . . . electrode
PE . . . positive electrode
NE . . . negative electrode
SE1 . . . separator
LBA . . . laminate battery (laminate cell)
PS . . . positive electrode sheet
NS . . . negative electrode sheet
SE . . . separator
AS . . . aluminum laminate sheet
PA . . . hand-operated hydraulic press
UPA . . . unpressed portion
PP . . . pressing member
MP . . . placement member
DG . . . dial gauge
T . . . table

The invention claimed is:

1. A positive electrode active material for nonaqueous electrolyte secondary batteries, comprising
lithium-nickel composite oxide particles that consist of secondary particles, the secondary particles being each formed by agglomeration of a plurality of primary particles and including pores, have a composition represented by $Li_zNi_{1-x-y}Co_xM_yW_aO_{2+\alpha}$ where $0 \leq x \leq 0.35$; $0 \leq y \leq 0.35$; $0.95 \leq z \leq 1.30$; $0 < a \leq 0.03$; $0 \leq \alpha \leq 0.15$; and M is at least one element selected from Mg, Al, Ca, Ti, V, Cr, Mn, Nb, Zr, and Mo, and have a layered crystal structure, wherein
the lithium-nickel composite oxide particles have an average particle size of 15 μm or more and 30 μm or less, a percentage of a sum of cross-sectional areas of all the pores in cross-sections of the lithium-nickel composite oxide particles with respect to a sum of areas of the cross-sections of the lithium-nickel composite oxide particles is 1.0% or more and 5.0% or less,
a lithium-tungsten compound containing tungsten and lithium is present on the surface of and inside the secondary particles,
the lithium-tungsten compound is present on at least part of the surface of the primary particles, and
the amount of lithium contained in a lithium compound other than the lithium-tungsten compound present on the surface of the primary particles with respect to the total amount of the lithium-nickel composite oxide particles is 0.05% by mass or less.

2. The positive electrode active material for nonaqueous electrolyte secondary batteries of claim 1, wherein the sulfate group content of the positive electrode active material for nonaqueous electrolyte secondary batteries is 0.15% by mass or less.

3. The positive electrode active material for nonaqueous electrolyte secondary batteries of claim 1, wherein the tap density of the positive electrode active material for nonaqueous electrolyte secondary batteries is 2.5 g/cm$^3$ or more.

4. The positive electrode active material for nonaqueous electrolyte secondary batteries of claim 1, wherein the lithium-tungsten compound contains 0.05% by atom or more and 3.0% by atom or less of tungsten with respect to the sum of the atomic numbers of Ni, Co, and M contained in the lithium-nickel composite oxide particles.

5. The positive electrode active material for nonaqueous electrolyte secondary batteries of claim 1, wherein the lithium-tungsten compound contains lithium tungstate.

6. The positive electrode active material for nonaqueous electrolyte secondary batteries of claim 1, wherein the lithium-tungsten compound is present on at least part of the surface of the primary particles as fine particles having particle sizes of 1 nm or more and 500 nm or less.

7. The positive electrode active material for nonaqueous electrolyte secondary batteries of claim 1, wherein the lithium-tungsten compound is present on at least part of the surface of the primary particles as coatings having thicknesses of 1 nm or more and 200 nm or less.

8. The positive electrode active material for nonaqueous electrolyte secondary batteries of claim 1, wherein the lithium-tungsten compound is present on at least part of the surface of the primary particles as both particles having particle sizes of 1 nm or more and 500 nm or less and coatings having thicknesses of 1 nm or more and 200 nm or less.

9. A method for producing a positive electrode active material for nonaqueous electrolyte secondary batteries, the positive electrode active material comprising lithium-nickel composite oxide particles that consist of secondary particles, the secondary particles being each formed by agglomeration of a plurality of primary particles and including pores, have a composition represented by $Li_zNi_{1-x-y}Co_xM_yW_aO_{2+\alpha}$ where $0 \leq x \leq 0.35$; $0 \leq y \leq 0.35$; $0.95 \leq z \leq 1.30$; $0 < a \leq 0.03$; $0 \leq \alpha \leq 0.15$; and M is at least one element selected from Mg, Al, Ca, Ti, V, Cr, Mn, Nb, Zr, and Mo, and have a layered crystal structure, the method comprising:

mixing a nickel composite hydroxide containing nickel and optionally cobalt and M, a nickel-oxy hydroxide obtained from the nickel composite hydroxide, a nickel composite oxide, or a mixture thereof, and a lithium compound so that the molar ratio of lithium in the lithium compound to the sum of the atomic numbers of Ni, Co, and M in the nickel composite hydroxide becomes 0.95 or more and 1.30 or less, to obtain a lithium mixture;

firing the lithium mixture at 700° C. or more and 900° C. or less in an oxidizing atmosphere to obtain lithium-nickel composite oxide particles;

mixing the lithium-nickel composite oxide particles obtained after the firing with water to form a lithium-nickel composite oxide slurry, cleaning the lithium-nickel composite oxide particles by stirring the slurry, and then solid-liquid separating the resulting slurry to obtain a cleaned cake comprising the lithium-nickel composite oxide particles;

mixing the cleaned cake and a tungsten compound that is substantially free of lithium to obtain a tungsten mixture; performing a first heat-treatment involving heat-treating the tungsten mixture to dissolve the tungsten compound and thus to form lithium-nickel composite oxide particles where tungsten is dispersed on the surface of the primary particles and on the surface of and inside the secondary particles; and after the first heat-treatment, performing a second heat-treatment involving performing a heat-treatment at a higher temperature than in the first heat-treatment to obtain lithium-nickel composite oxide particles whose porosity is 1.0% or more and 5.0% or less and where a lithium-tungsten compound is formed on the surface of the primary particles and on the surface of and inside the secondary particles, wherein the lithium-nickel composite oxide particles have an average particle size of 15 μm or more and 30 μm or less, in which a percentage of a sum of cross-sectional areas of all the pores in cross-sections of the lithium-nickel composite oxide particles with respect to a sum of areas of the cross-sections of the lithium-nickel composite oxide particles is 1.0% or more and 5.0% or less, a lithium-tungsten compound containing tungsten and lithium is present on the surface of and inside the secondary particles, the lithium-tungsten compound is present on at least part of the surface of the primary particles, and the amount of lithium contained in a lithium compound other than the lithium-tungsten compound present on the surface of the primary particles with respect to the total amount of the lithium-nickel composite oxide particles is 0.05% by mass or less.

10. The method for producing the positive electrode active material for nonaqueous electrolyte secondary batteries of claim 9, wherein the nickel composite hydroxide is obtained using a method comprising:

charging an aqueous solution containing nickel and optionally cobalt and M and an aqueous solution containing an ammonium ion donor into a reaction bath whose temperature is controlled to 40° C. or more and 60° C. or less to obtain a reaction solution and adding an aqueous solution of sodium hydroxide to the reaction solution so that the pH of the reaction solution is controlled to 12.0 or more and 14.0 or less on a 25° C. solution temperature basis and the ammonia concentration is controlled to 5 g/L or more and 20 g/L or less, to obtain a nickel composite hydroxide slurry;

solid-liquid separating the nickel composite hydroxide slurry to obtain a nickel composite hydroxide cake; and cleaning the nickel composite hydroxide cake with water, or cleaning the nickel composite hydroxide cake with an aqueous solution of sodium hydroxide and then cleaning the resulting nickel composite hydroxide cake with water, and then drying the resulting nickel composite hydroxide cake.

11. The method for producing the positive electrode active material for nonaqueous electrolyte secondary batteries of claim 10, wherein the nickel composite hydroxide cake is cleaned with 3.5% by mass or less of an aqueous solution of sodium hydroxide.

12. The method for producing the positive electrode active material for nonaqueous electrolyte secondary batteries of claim 9, wherein the sulfate group content of the nickel composite hydroxide is 0.5% by mass or more and 2.0% by mass or less.

13. The method for producing the positive electrode active material for nonaqueous electrolyte secondary batteries of claim 9, wherein the lithium mixture is obtained by mixing a nickel composite oxide obtained by oxidizing-roasting the nickel composite hydroxide at a temperature of 500° C. or more and 750° C. or less, and the lithium compound.

14. The method for producing the positive electrode active material for nonaqueous electrolyte secondary batteries of claim 9, wherein the concentration of the lithium-nickel composite oxide slurry is 500 g/L or more and 2500 g/L or less.

15. The method for producing the positive electrode active material for nonaqueous electrolyte secondary batteries of claim 9, wherein the water content of the cleaned cake is controlled to 3.0% by mass or more and 15.0% by mass or less.

16. The method for producing the positive electrode active material for nonaqueous electrolyte secondary batteries of claim 9, wherein the lithium compound is at least one selected from lithium hydroxide, lithium carbonate, and lithium acetate.

17. The method for producing the positive electrode active material for nonaqueous electrolyte secondary batteries of claim 9, wherein the tungsten compound is at least one selected from tungsten oxide, tungstic acid, ammonium paratungstate, and sodium tungstate.

18. The method for producing the positive electrode active material for nonaqueous electrolyte secondary batteries of claim 9, wherein the first heat-treatment and the second heat-treatment are performed in one of a decarboxylated air atmosphere, an inert gas atmosphere, and a vacuum atmosphere.

19. The method for producing the positive electrode active material for nonaqueous electrolyte secondary batteries of claim 9, wherein the first heat-treatment is performed at a heat-treatment temperature of 60° C. or more and 80° C. or less.

20. The method for producing the positive electrode active material for nonaqueous electrolyte secondary batteries of claim 9, wherein the second heat-treatment is performed at a heat-treatment temperature of 100° C. or more and 200° C. or less.

21. A nonaqueous electrolyte secondary battery comprising a positive electrode comprising the positive electrode active material for nonaqueous electrolyte secondary batteries of claim 1.

22. The positive electrode active material for nonaqueous electrolyte secondary batteries of claim 1, wherein the lithium compound other than the lithium-tungsten compound present on the surface of the primary particles includes lithium hydroxide and lithium carbonate.

\* \* \* \* \*